(12) United States Patent
Bogolea et al.

(10) Patent No.: US 10,713,621 B2
(45) Date of Patent: Jul. 14, 2020

(54) METHOD FOR TRACKING AND CHARACTERIZING PERISHABLE GOODS IN A STORE

(71) Applicant: Simbe Robotics, Inc., South San Francisco, CA (US)

(72) Inventors: Bradley Bogolea, San Francisco, CA (US); Durgesh Tiwari, San Francisco, CA (US); Jariullah Safi, San Francisco, CA (US)

(73) Assignee: Simbe Robotics, Inc., San Francisco, CA (US)

( * ) Notice: Subject to any disclaimer, the term of this patent is extended or adjusted under 35 U.S.C. 154(b) by 0 days.

(21) Appl. No.: 16/594,364

(22) Filed: Oct. 7, 2019

(65) Prior Publication Data

US 2020/0111053 A1  Apr. 9, 2020

Related U.S. Application Data

(60) Provisional application No. 62/742,213, filed on Oct. 5, 2018.

(51) Int. Cl.
| | |
|---|---|
| *G06Q 10/08* | (2012.01) |
| *G06K 9/62* | (2006.01) |
| *G06K 9/46* | (2006.01) |
| *G06K 9/00* | (2006.01) |

(52) U.S. Cl.
CPC ..... *G06Q 10/0875* (2013.01); *G06K 9/00664* (2013.01); *G06K 9/4642* (2013.01); *G06K 9/6215* (2013.01); *G06K 9/00671* (2013.01); *G06Q 10/087* (2013.01)

(58) Field of Classification Search
CPC .......................... G06Q 10/087; G06K 9/00671
See application file for complete search history.

(56) References Cited

U.S. PATENT DOCUMENTS

| | | | |
|---|---|---|---|
| 2017/0011276 A1* | 1/2017 | Mehring | G06K 9/4652 |
| 2017/0193434 A1* | 7/2017 | Shah | G06K 9/00664 |
| 2018/0365820 A1 | 12/2018 | Nipe et al. | |
| 2018/0365822 A1 | 12/2018 | Nipe et al. | |
| 2019/0285603 A1* | 9/2019 | Velez | G06Q 10/087 |

* cited by examiner

*Primary Examiner* — A. Hunter Wilder
(74) *Attorney, Agent, or Firm* — Run8 Patent Group, LLC; Peter Miller

(57) ABSTRACT

One variation of a method for tracking fresh produce in a store includes: accessing a first hyper-spectral image, of a produce display in a store, recorded at a first time; extracting a first spectral profile from a first region of the first hyperspectral image depicting a first set of produce units in the produce display; identifying a first varietal of the first set of produce units; characterizing qualities (e.g., ripeness, bruising, spoilage) of the first set of produce units in the produce display based on the first spectral profile; and, in response to qualities of the first set of produce units in the produce display deviating from a target quality range assigned to the first varietal, generating a prompt to audit the first set of produce units in the produce display.

18 Claims, 4 Drawing Sheets

METHOD FOR TRACKING AND CHARACTERIZING PERISHABLE GOODS IN A STORE

CROSS-REFERENCE TO RELATED APPLICATIONS

This Application claims the benefit of U.S. Provisional Application No. 62/742,213, filed on 5 Oct. 2018, which is incorporated in its entirety by this reference.

This Application is related to U.S. patent application Ser. No. 15/347,689, filed on 9 Nov. 2016, and to U.S. patent application Ser. No. 15/600,527, filed on 19 May 2017, each of which is incorporated in its entirety by this reference.

TECHNICAL FIELD

This invention relates generally to the field of stock tracking and more specifically to a new and useful method for tracking and characterizing perishable goods in a store in the field of stock tracking.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
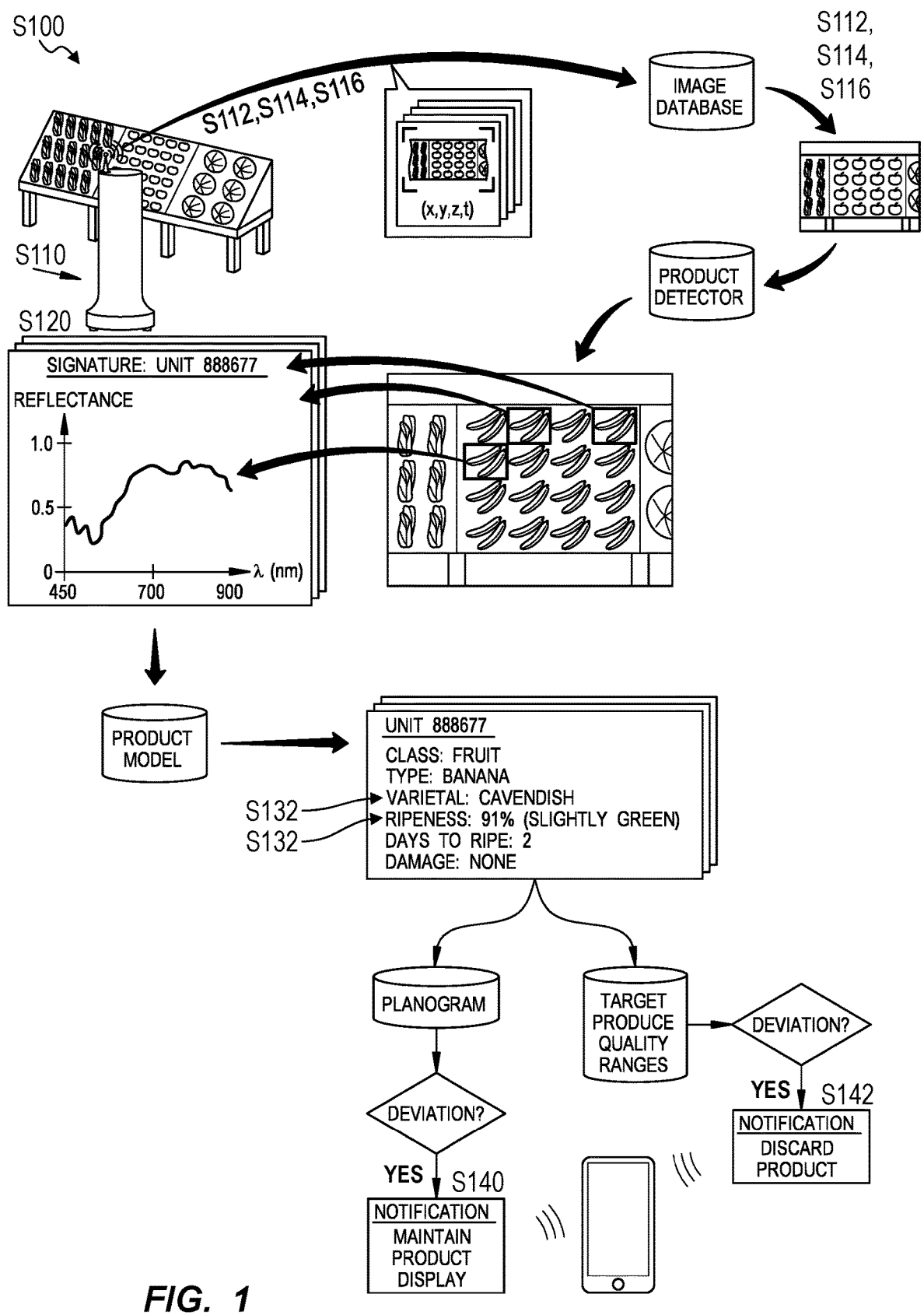
FIG. 1 is a flowchart representation of a method.

As shown in FIG. 1, a method S100 for tracking and characterizing perishable goods in a store includes: accessing a first hyper-spectral image, of a produce display in a store, recorded at a first time in Block S112; extracting a first spectral profile from a first region of the first hyper-spectral image depicting a first set of produce units in the produce display in Block S120; identifying a first varietal of the first set of produce units in Block S130; characterizing qualities of the first set of produce units in the produce display based on the first spectral profile in Block S132; and, in response to qualities of the first set of produce units in the produce display deviating from a target quality range assigned to the first varietal, generating a prompt to audit the first set of produce units in the produce display in Block S142.

Figure 4:
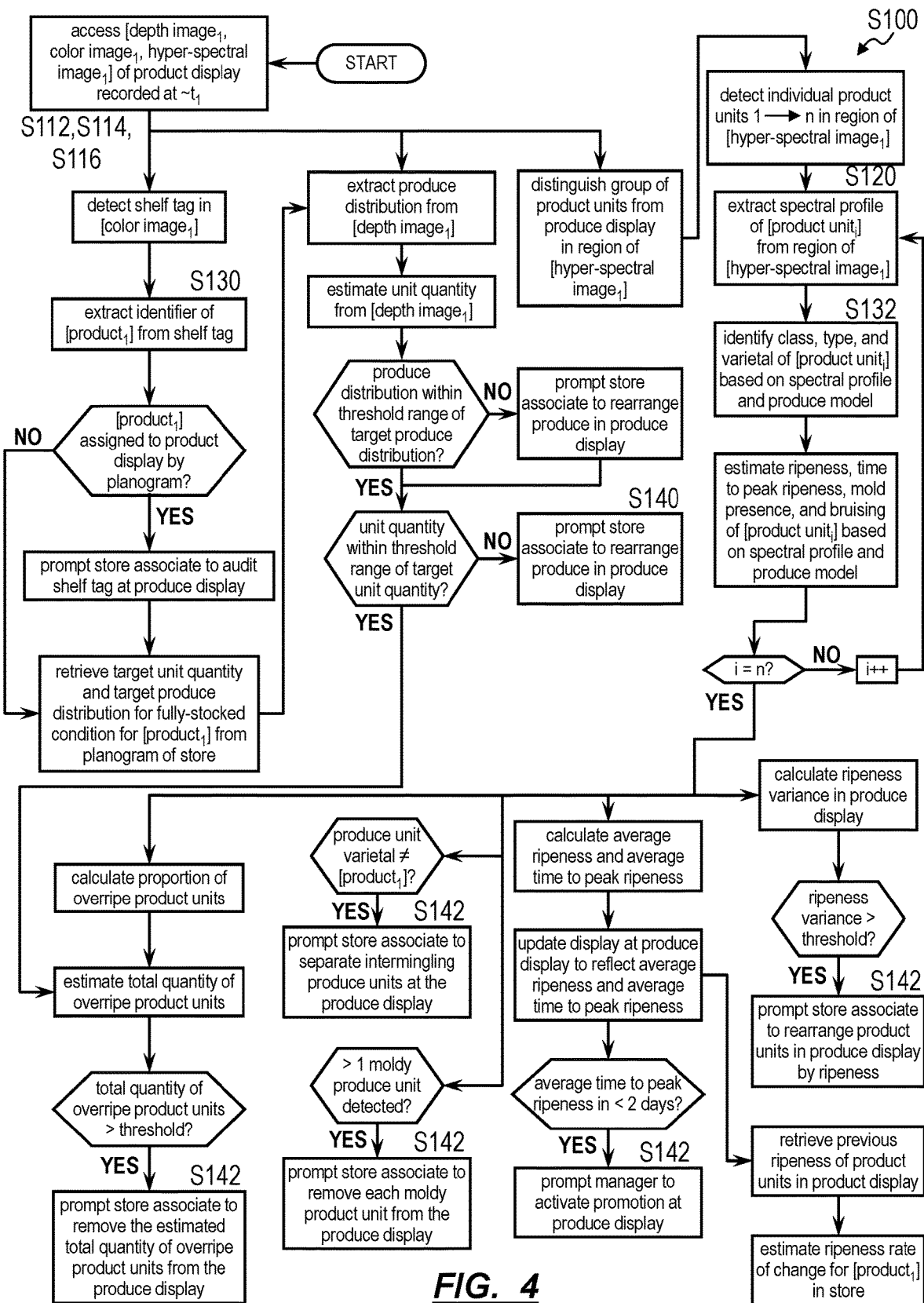
FIG. 4 is a schematic representation of one variation of the method.

Another variation of the method S100 shown in FIG. 4 includes: dispatching a robotic system to autonomously navigate throughout a store during a first scan cycle in Block S110; accessing a first hyper-spectral image recorded by the robotic system while occupying a first location within the store at a first time during the first scan cycle in Block S112; extracting a first spectral profile from a first region of the first hyper-spectral image depicting a first produce unit in Block S120; identifying a first varietal of the first produce unit based on the first spectral profile in Block S130; identifying a ripeness of the first produce unit based on the first spectral profile in Block S132; and, in response to the first ripeness of the first produce unit deviating from a target ripeness range assigned to the first varietal, generating a prompt to remove the first produce unit from a produce display proximal the first location in the store in Block S142.

Another variation of the method S100 shown in FIG. 4 includes: accessing a first depth image, of a produce display in a store, recorded at a first time in Block S114; accessing a first hyper-spectral image, of the produce display, recorded at approximately the first time in Block S112; extracting a volumetric representation of a set of produce units, occupying the produce display, from the depth image in Block S114; extracting a set of hyper-spectral features from a first region of the first hyper-spectral image depicting the set of produce units in Block S132; identifying a varietal of the set of produce units based on the set of hyper-spectral features in Block S130; estimating a produce quality of the set of produce units based on the set of hyper-spectral features in Block S132; in response to the volumetric representation of the set of produce units deviating from a target produce distribution assigned to the produce display, generating a prompt to rectify produce in the produce display in Block S140; and, in response to the produce quality of the set of produce units deviating from a target quality range assigned to the varietal, generating a prompt to remove produce units, in the set of produce units, from the produce display with in Block S142.

2. Applications

Generally, the method S100 can be executed by a computer system (e.g., by a local computer network, by a remote server) in conjunction with a robotic system deployed within a store (e.g., a grocery store) and/or with a set of fixed camera modules installed within the store: to collect hyper-spectral images of perishable goods stocked throughout the store, such as loose or packaged raw fruits, vegetables, meats, seafood, and/or other fresh produce (hereinafter "produce units"); to extract spectral profiles representative of these produce units from these hyper-spectral images; and to leverage a one or more product models to automatically identify "classes," "types," "varietals," and/or characteristics (or "qualities") of these produce units based on their representative spectral profiles. The computer system can then: detect produce units located in incorrect locations throughout the store (e.g., in unassigned produce displays) and automatically prompt associates of the store to correct such misstocked produce units; and/or distinguish overripe or spoiled (e.g., rotting, rancid) produce units from underripe and ripe produce units and automatically prompt associates of the store to discard or replace such overripe or spoiled produce units.

The computer system can also execute Blocks of the method S100 to non-invasively and non-destructively detect ripeness levels of produce units—such as fruits and vegetables—and then automatically prompt associates of the store to sort, replace, redistribute these produce units accordingly. For example, the computer system can prompt associates of the store: to sort produce units in produce displays by ripeness, such as by placing ripe produce units at the front or top of the produce display and underripe produce units at the back or bottom of the produce display; to manually search for and discard overripe produce units from produce displays; to discount groups of produce units that are overripe or approaching overripeness; to withhold groups of underripe produce units from the store floor or return such groups to back of store inventory until these produce units approach a minimum degree of ripeness; and/or to replace groups of overripe (or spoiled, rotting) produce units with produce units of the same varietal but at an early ripeness stage; etc. The computer system can similarly: distinguish bruised, burned, wilted, or otherwise damaged produce units based on spectral signatures extracted from hyper-spectral images of these produce units; and selectively prompt store associates to discard, replace, and/or reject such damaged produce units in produce displays on the store floor, in back-of-store inventory, and/or at a receiving dock at the store.

The computer system can further execute Blocks of the method S100 to predict future supply of underripe and ripe produce units (e.g., fruits, vegetables, fresh meats)—such as based on characteristics of these produce units, temporal ripening models, and temporal spoiling models for these product classes, types, and varietals—which a manager or associate of the store may then reference when placing orders for additional perishable inventory in the future.

The computer system can therefore: interface with the robotic system and/or fixed sensors in the store to access hyper-spectral images of produce displays, produce bins, or other slots—containing produce units—located throughout the store; and then execute Blocks of the method S100 to identify these produce units, such as their classes, types, and varietals and to identify characteristics of individual produce units or groups of produce units depicted in these hyper-spectral images. For example, the computer system can execute Blocks of the method S100 to non-intrusively and non-destructively derive characteristics of these produce units, including: biological characteristics (e.g., presence of mold); chemical characteristics (e.g., ripeness, freshness, nutrient levels, superficial rot, internal rot); visual characteristics (e.g., bruising) of these produce units; and/or higher-level attributes (e.g., overall "quality") of these produce units based on features extracted from hyper-spectral images of these produce units.

The method S100 is described below as executed by a remote computer system, such as a computer network or a remote server. However, Blocks of the method S100 can additionally or alternatively be executed locally by the robotic system, at a fixed camera module installed in the store, or by a local computer system located within the store. Furthermore, the method S100 is described herein as executed by the computer system in conjunction with a retail setting—such as a grocery store—stocked with fresh meats, vegetables, fruits, and/or fresh other produce. However, the method S100 can additionally or alternatively be executed in conjunction with a back-of-store inventory setting—such as a wholesale facility, produce holding facility, or produce distribution facility—stocked with such fresh produce products.

3. Robotic System

A robotic system autonomously navigates throughout a store and records images—such as color (e.g., RGB) images of packaged goods, hyper-spectral images of fresh produce and other perishable goods, and/or depth images of produce displays—continuously or at discrete predefined waypoints throughout the store during a scan cycle. Generally, the robotic system can define a network-enabled mobile robot configured to autonomously: traverse a store; capture color, hyper-spectral, and/or depth images of shelving structures, shelves, produce displays, etc. within the store; and upload those images to the computer system for analysis, as described below.

Figure 2:
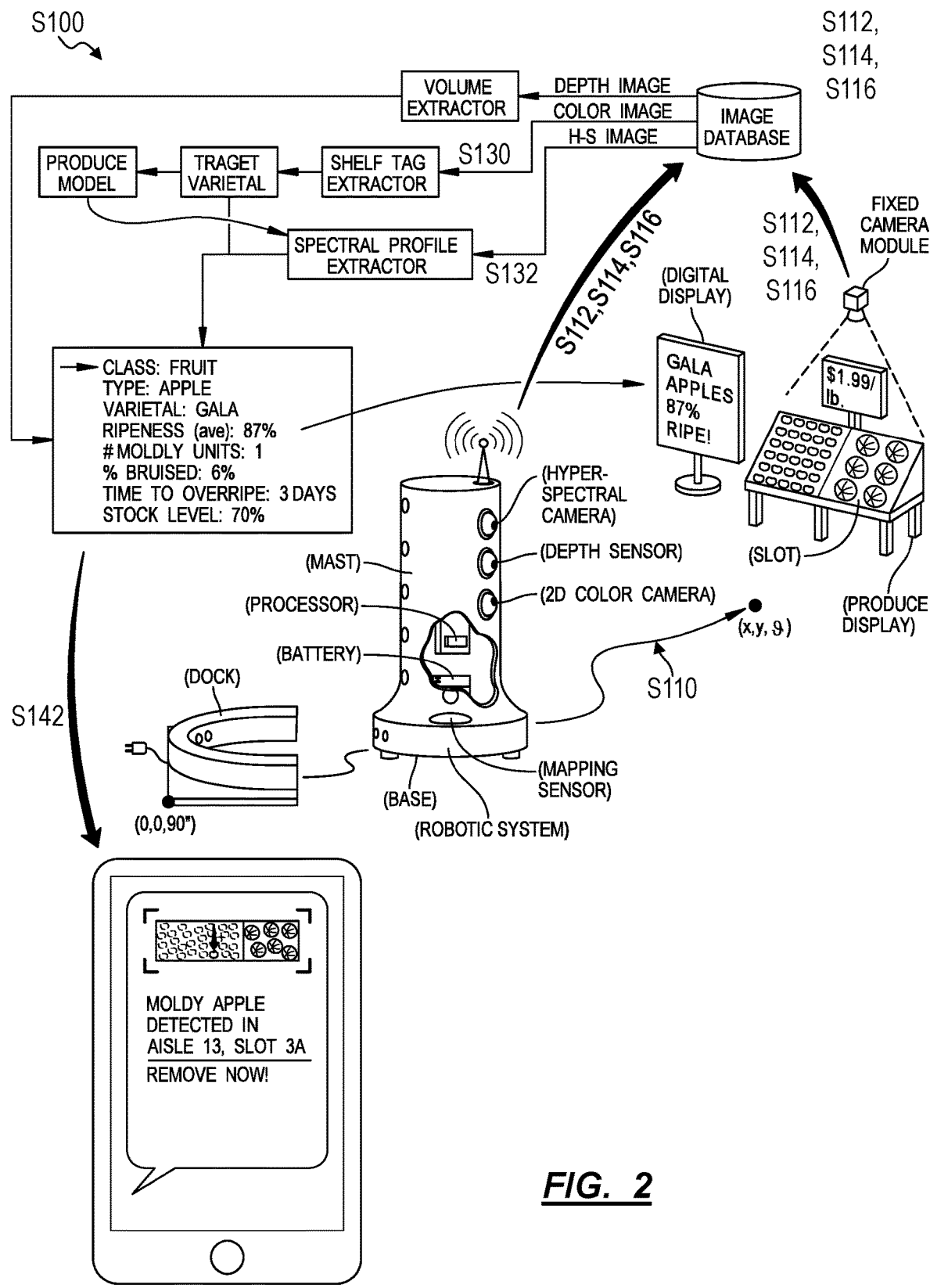
FIG. 2 is a schematic representation of one variation of the method.

In one implementation shown in FIG. 2, the robotic system defines an autonomous imaging vehicle including: a base; a drive system (e.g., a pair of two driven wheels and two swiveling castors) arranged in the base; a power supply (e.g., an electric battery); a set of mapping sensors (e.g., fore and aft scanning LIDAR systems configured to generate depth images); a processor that transforms data collected by the mapping sensors into two- or three-dimensional maps of a space around the robotic system; a mast extending vertically from the base; a set of color cameras arranged on the mast; one or more hyper-spectral cameras (or "cameras," "imagers") arranged on the mast and configured to record hyper-spectral images representing intensities of electromagnetic radiation within and outside of the visible spectrum; and a wireless communication module that downloads waypoints and a master map of a store from a computer system (e.g., a remote server) and that uploads photographic images captured by the camera and hyper-spectral images captured by the hyper-spectral camera and maps generated by the processor to the computer system, as shown in FIG. 2. In this implementation, the robotic system can include cameras and hyper-spectral cameras mounted statically to the mast, such as two vertically offset cameras and hyper-spectral cameras on a left side of the mast and two vertically offset cameras and hyper-spectral cameras on the right side of mast, as shown in FIG. 2. The robotic system can additionally or alternatively include articulable cameras and hyper-spectral cameras, such as: one camera and hyper-spectral camera on the left side of the mast and supported by a first vertical scanning actuator; and one camera and hyper-spectral camera on the right side of the mast and supported by a second vertical scanning actuator. The robotic system can also include a zoom lens, a wide-angle lens, or any other type of lens on each camera and/or hyper-spectral camera. However, the robotic system can define any other form and can include any other subsystems or elements supporting autonomous navigating and image capture throughout a store environment.

Furthermore, multiple robotic systems can be deployed in a single store and can be configured to cooperate to image shelves and produce units within the store. For example, two robotic systems can be deployed to a large single-floor retail store and can cooperate to collect images of all shelves and produce displays in the store within a threshold period of time (e.g., within one hour). In another example, one robotic system is deployed on each floor of a multi-floor store, and each robotic system collects images of shelves and produce displays on its corresponding floor. The computer system can then aggregate color, hyper-spectral, and/or depth images captured by these robotic systems deployed in this store to generate a graph, map, table, and/or task list for managing distribution and maintaining quality of fresh produce displayed throughout the store.

4. Fixed Camera Module

Additionally or alternatively, the computer system can access color, hyper-spectral, and/or depth images captured by a fixed camera module installed in the store, as shown in FIG. 2. In one implementation, a fixed camera module includes: an optical sensor defining a field of view; a motion sensor configured to detect motion in or near the field of view of the optical sensor; a wireless communication module configured to wirelessly transmit images recorded by the optical sensor; a battery configured to power the optical sensor and the wireless communication module over an extended duration of time (e.g., one year, five years); and a housing configured to contain the optical sensor, the motion sensor, the wireless communication module, and the battery. In this implementation, the housing can be further configured to mount to a surface within the store such that a produce display in the store falls with the field of view of the optical sensor.

For example, the optical sensor can include a hyper-spectral camera, such as a one-shot single measurement step hyper-spectral (or "SHI") camera configured to output hyper-spectral images. The fixed camera module can also include: a color camera configured to record and output 2D color images; and/or a depth camera configured to record and output 2D depth images or 3D point clouds. However, the fixed camera module can include any other type of optical sensor and can output visual or optical data in any other format.

In another example, the motion sensor in the fixed camera module includes a passive infrared sensor: that defines a field of view overlapping the field of view of the optical sensor; and configured to passively output a signal representing motion within (or near) the field of view of optical sensor. However, the fixed camera module can include a motion sensor of any other type.

The optical sensor, motion sensor, battery, and wireless communication module, etc. can be arranged within a single housing configured to install on an inventory structure—such as by adhering or mechanically fastening to a shelf face or surface within a shelving segment—with the field of view of the optical sensor facing a shelf below, an adjacent slot, or a shelving segment on an opposing side of an aisle in the store, etc. Additionally or alternatively, the housing can be configured to mount to a ceiling, post, or other inventory structure and oriented such that the field of view of the optical sensor(s) in the fixed camera module face one or a set of produce displays below.

In one variation described below, the fixed camera module includes a wireless energy/wireless charging subsystem configured to harvest energy from a signal broadcast by the robotic system during a scan cycle (or broadcast by another fixed or mobile transmitter nearby). However, the fixed camera module can define any other form and can mount to a surface, ceiling, or inventory structure in any other way.

Furthermore, the fixed camera module can transition from an inactive state to an active state on a regular interval (e.g., once per hour), on a regular schedule (e.g., proportional to historical patron occupancy in the store), when triggered by the robotic system or remote computer system, and/or responsive to an output from the motion sensor that indicates motion detected in the field of view of the optical sensor. Once in the active state, the fixed camera module can: trigger the hyper-spectral camera to record a hyper-spectral image; trigger the color camera to record a color image; and trigger the depth sensor to record a depth image. The wireless communication module can then broadcast these images to a wireless router in the store. Alternatively, the fixed camera module can store these images in local memory (e.g., a buffer), and the wireless communication module can wirelessly transmit images from the buffer to the robotic system when requested by the robotic system during a next scan cycle (e.g., when the robotic system navigates to a location near the fixed camera module during a next scan cycle).

Alternately, the fixed camera module can record hyper-spectral, color, and depth images on a regular interval (e.g., once per second; once per ten-minute interval) and return this image feed to the remote computer system for processing according to Blocks of the method S100. However, the fixed camera module can capture and return hyper-spectral, color, and depth images of a produce display to the remote computer system at any other rate and in any other way.

5. Hierarchy and Terms

A "product facing" is referred to herein as a side of a product (e.g., of a particular SKU or other product identifier) designated for a slot. A "planogram" is referred to herein as a plan or layout for display of multiple product facings across many shelving structures, produce displays, and other inventory structures within a store (e.g., across an entire store). In particular, the planogram can specify target product identification, target product placement, target product quantity, target product quality (e.g., ripeness, time to peak ripeness, maximum bruising), and product orientation data for product facings and groups of loose produce units for fully-stocked shelving structures, produce displays, and other inventory structures within the store. For example, the planogram can define a graphical representation of produce units assigned to slots in one or more inventory structures within the store. Alternatively, the planogram can record textual product placement for one or more inventory structures in the store in the form of a spreadsheet, slot index, or other database (hereinafter a "product placement database").

A "slot" is referred to herein as a section (or a "bin") of a "produce display" designated for storing and displaying loose produce units, such as produce units of the same class, type, and varietal. A produce display can include an open, closed, humidity-controller, temperature-controlled, and/or other type of produce display containing one or more slots on one or more shelves. A "store" is referred to herein as a (static or mobile) facility containing one or more produce displays.

A "product" is referred to herein as a type of loose or packaged good associated with a particular product identifier (e.g., a SKU) and representing a particular class, type, and varietal. A "unit" or "produce unit" is referred to herein as an instance of a product—such as one apple, one head of lettuce, or once instance of a cut of meat—associated with one SKU value.

Furthermore, a "realogram" is referred to herein as a representation of the actual products, actual product placement, actual product quantity, actual product quality (e.g., ripeness, time to peak ripeness, maximum bruising), and actual product orientation of products and produce units throughout the store during a scan cycle, such as derived by the computer system according to Blocks of the method S100 based on hyper-spectral images and other data recorded by the robotic system and/or fixed camera modules deployed in the store.

The method S100 is described herein as executed by a computer system (e.g., a remote server, a computer network). However, Blocks of the method S100 can be executed by one or more robotic systems or fixed camera modules deployed in a retail space (or store, warehouse, etc.), by a local computer system (e.g., a local server), or by any other computer system—hereinafter a "system."

Furthermore, Blocks of the method S100 are described below as executed by the computer system to identify products stocked on open shelves on shelving structures within a store. However, the computer system can implement similar methods and techniques to identify products stocked in cubbies, in a refrigeration unit, on a wall rack, in a freestanding floor rack, on a table, in a hot-food display, or on or in any other product organizer or display in a retail space.

6. Robotic System Deployment and Scan Cycle

Block S110 of the method S100 recites dispatching a robotic system to autonomously navigate throughout a store and to record hyper-spectral images of produce displays within the store during a scan cycle. Generally, in Block S110, the computer system can dispatch the robotic system to autonomously navigate along a preplanned sequence of waypoints or along a dynamic path and to record color, depth, and/or hyper-spectral images of inventory structures throughout the store.

6.1 Scan Cycle: Waypoints

In one implementation, the computer system: defines a set of waypoints specifying target locations within the store through which the robotic system navigates and captures images of inventory structures throughout the store during a scan cycle; and intermittently (e.g., twice per day) dispatches the robotic system to navigate through this sequence of waypoints and to record images of inventory structures nearby during a scan cycle. For example, the robotic system can be installed within a store, and the computer system can dispatch the robotic system to execute a scan cycle during store hours, including navigating to each waypoint throughout the store and collecting data representative of the stock state of the store in near real-time as patrons move, remove, and occasionally return product on, from, and to inventory structures within the store (e.g., shelving structures, refrigeration units, produce displays, hanging racks, cubbies, etc.). During this scan cycle, the robotic system can: record black-and-white or color photographic images of each inventory structure; record depth images of all or select inventory structures; selectively record hyper-spectral images of produce displays containing fresh produce; and upload these photographic, depth, and hyper-spectral images to the remote computer system, such as in real-time or upon conclusion of the scan cycle. The computer system can then: detect types and quantities of packaged goods stocked in slots on these inventory structures in the store based on data extracted from these photographic and depth images; detect types, quantities, and qualities of loose produce in produce displays in the store based on data extracted from these hyper-spectral and depth images according to Blocks of the method S100; and aggregate these data into a realogram of the store.

The computer system can therefore maintain, update, and distribute a set of waypoints to the robotic system, wherein each waypoint defines a location within a store at which the robotic system is to capture one or more images from the integrated color, depth, and hyper-spectral cameras. In one implementation, the computer system defines an origin of a two-dimensional Cartesian coordinate system for the store at a charging station—for the robotic system—placed in the store, and a waypoint for the store defines a location within the coordinate system, such as a lateral ("x") distance and a longitudinal ("y") distance from the origin. Thus, when executing a waypoint, the robotic system can navigate to (e.g., within three inches of) a (x,y) coordinate of the store as defined in the waypoint. For example, for a store that includes shelving structures with four-foot-wide shelving segments and six-foot-wide aisles, the computer system can define one waypoint laterally and longitudinally centered—in a corresponding aisle—between each opposite shelving segment pair. A waypoint can also define a target orientation, such as in the form of a target angle ("a") relative to the origin of the store, based on an angular position of an aisle or shelving structure in the coordinate system. When executing a waypoint, the robotic system can orient to (e.g., within 1.5° of) the target orientation defined in the waypoint in order to align the suite of color, depth, and hyper-spectral cameras to an adjacent shelving structure or produce display.

When navigating to a next waypoint, the robotic system can scan its environment with the same or other depth sensor (e.g., a LIDAR sensor, as described above), compile depth scans into a new map of the robotic system's environment, determine its location within the store by comparing the new map to a master map of the store defining the coordinate system of the store, and navigate to a position and orientation within the store at which the output of the depth sensor aligns—within a threshold distance and angle—with a region of the master map corresponding to the (x,y,∂) location and target orientation defined in this next waypoint.

In this implementation, before initiating a new scan cycle, the robotic system can download—from the computer system—a set of waypoints, a preferred order for the waypoints, and a master map of the store defining the coordinate system of the store. Once the robotic system leaves its dock at the beginning of a scan cycle, the robotic system can repeatedly sample its integrated depth sensors (e.g., a LIDAR sensor) and construct a new map of its environment based on data collected by the depth sensors. By comparing the new map to the master map, the robotic system can track its location within the store throughout the scan cycle. Furthermore, before navigating to a next scheduled waypoint, the robotic system can confirm completion of the current waypoint based on alignment between a region of the master map corresponding to the (x,y,∂) location and target orientation defined in the current waypoint and a current output of the depth sensors, as described above.

However, the robotic system can implement any other methods or techniques to navigate to a position and orientation in the store that falls within a threshold distance and angular offset from a location and target orientation defined by a waypoint.

6.2 Scan Cycle: Dynamic Path

In another implementation, during a scan cycle, the robotic system can autonomously generate a path throughout the store and execute this path in real-time based on: obstacles (e.g., patrons, spills, inventory structures) detected nearby; priority or weights previously assigned to inventory structures or particular slots within the store; and/or product sale data from a point-of-sale system connected to the store and known locations of products in the store, such as defined in a planogram; etc. For example, the computer system can dynamically generate its path throughout the store during a scan cycle to maximize a value of inventory structures or particular products imaged by the robotic system per unit time responsive to dynamic obstacles within the store (e.g., patrons, spills), such as described in U.S. patent application Ser. No. 15/347,689.

In this implementation, the robotic system can then continuously capture color, depth, and/or hyper-spectral images of inventory structures in the store (e.g., at a rate of 10 Hz, 24 Hz). However, in this implementation, the robotic system can capture images of inventory structures within the store at any other frequency during this scan cycle.

6.3 Scan Cycle Scheduling

In one implementation, the robotic system can continuously navigate and capture scan data of inventory structures within the store; when a state of charge of a battery in the robotic system drops below a threshold state, the robotic system can return to a charging station to recharge before resuming autonomous navigation and data capture throughout the store.

Alternatively, the computer system can schedule the robotic system to execute intermittent scan cycles in the store, such as: twice per day during peak store hours (e.g., 11 AM and 6 PM on weekdays) in order to enable rapid detection of stock condition changes as patrons remove, return, and/or move products throughout the store; and/or every night during close or slow hours (e.g., 1 AM) to enable detection of stock conditions and systematic restocking of understocked slots in the store before the store opens the following morning or before a next peak period in the store.

However, the computer system can dispatch the robotic system to execute scan cycles according to any other fixed or dynamic schedule.

6.4 Fixed Camera

Additionally or alternatively, the computer system can schedule image capture by fixed camera modules arranged throughout the store, such as: during scan cycles executed by the robotic system; outside of scan cycles executed by the robotic system; or in place of scheduling scan cycles by the robotic system. For example, the computer system can schedule a fixed camera module—arranged over a produce stand in the store—to record a set of color, depth, and hyper-spectral images 30 seconds after detecting motion in its proximity at a maximum rate of one set of color, depth, and hyper-spectral images per ten-minute interval. For example, by delaying capture of a set of color, depth, and hyper-spectral images—following detecting motion near the fixed camera module—by 30 seconds, the fixed camera module may: delay image capture until after a patron approaches the produce stand, selects a produce unit from the produce stand, and then walks away from the produce stand; and therefore capture these color, depth, and hyper-spectral images of the produce stand when the patron is less likely to still be standing near and thus obstructing the produce stand from view.

However, the fixed camera module can record a feed or discrete set of color, depth, and hyper-spectral images according to any other schema. The fixed camera module can then transmit these images back to the computer system, such as in real-time or during scheduled upload periods.

7. Image Access

Block S112 of the method S100 recites accessing a first hyper-spectral image, of a produce display in a store, recorded at a first time. The method S100 can further include: Block S114 recites accessing a first depth image, of the produce display, recorded at approximately the first time; and Block S116 recites accessing a first photographic image, of the produce display, recorded at approximately the first time. Generally, the robotic system and/or the fixed camera module can return color, hyper-spectral, and/or depth images recorded during a scan cycle to a remote database, such as in real-time during the scan cycle, upon completion of the scan cycle, or during scheduled upload periods. The computer system can then access these color, depth, and/or hyper-spectral images from this database in Blocks S116, S114, and S112, respectively, before processing these images according to subsequent Blocks of the method S100 described below.

For example, in Block S112, the computer system can: access a hyper-spectral image recorded by the robotic system while occupying a first location in the store proximal a produce display during a scheduled scan cycle; and/or access a hyper-spectral image recorded by a fixed camera module—installed proximal the produce display and defining a field of view intersecting the produce display—such as responsive to detecting motion proximal the produce display.

In one implementation, the computer system processes individual hyper-spectral images according to the method S100 in order to identify and characterize produce units depicted in these individual images. Alternatively, the computer system can: stitch multiple hyper-spectral images into one composite hyper-spectral image representing a greater horizontal span of one or a set of produce displays; and then process these "composite" hyper-spectral images according to methods and techniques described below.

8. Product Detection and Spectral Profile

Block S120 of the method S100 recites extracting a first spectral profile from a first region of the first hyper-spectral image depicting a first set of produce units in the produce display. Generally, in Block S120, the computer system can extract—from a hyper-spectral image (or composite hyper-spectral image generated from multiple hyper-spectral images) recorded by the robotic system or fixed camera module during a last scan cycle—a spectral profile characteristic of one produce unit or a set of produce units depicted in the hyper-spectral image.

8.1 Individual Produce Unit

In one implementation shown in FIG. 1, the computer system: implements edge detection or other computer vision techniques to distinguish singular produce units depicted in the hyper-spectral image; isolates edges (or "bounds") of a particular produce unit; extracts a subimage—in each channel of the hyper-spectral image—within the bounds of the particular produce unit from the hyper-spectral image; and extracts a spectral profile of the particular produce unit from this subimage. For example, for each channel in the hyper-spectral image, the computer system can detect and discard outlier pixel values in the subimage and calculate an average value, a range of values, and/or variance or standard deviation of values in the filtered set of pixels in this channel in the subimage. The computer system can then aggregate these values for each hyper-spectral channel in the subimage into a "spectral profile" of the produce unit depicted in this subimage of the hyper-spectral image.

In another implementation, the computer system can identify multiple groups of similar pixels within a subimage depicting a produce unit, wherein each group contains a set of pixels exhibiting substantially similar spectral reflectance intensities (e.g., low intensity variance) across many or all hyper-spectral channels. For each group of pixels in the subimage, the computer system can then calculate an average, minimum, maximum, and/or standard deviation of amplitudes (or "reflectances") of pixels in this group. In this example, the computer system can then assemble these average, minimum, maximum, and/or standard deviation values across all groups of similar pixels into a spectral profile representative of the produce unit depicted in this subimage.

In another implementation, the computer system: calculates a histogram of pixel values across all hyper-spectral channels for all pixels within a subimage of a produce unit; normalizes this histogram by a total quantity of pixels contained within this subimage; and stores this histogram as a spectral profile of the produce unit. For example, However, in Block S120, the computer system can implement any other method or technique to detect an individual produce unit and to extract or generate a spectral profile for this particular produce unit from a hyper-spectral image recorded by the robotic system during a last scan cycle (or by the fixed camera module). The computer system can repeat this process to generate spectral profiles of each other produce unit depicted in this same hyper-spectral image.

8.2 Produce Unit Groups

Alternatively, the computer system can implement similar methods and techniques to: detect a region of the hyper-spectral image depicting a group (e.g., a "stack," a "bunch") of produce units in a produce display; extract average spectral reflectance intensities, spectral reflectance intensity ranges, spectral reflectance intensity variance, and/or other metrics from this region in many or all changes in the hyper-spectral image; and then compile these metrics into one spectral profile of this group of produce units in the produce display, as shown in FIG. 2.

9. Produce Identification and Quality

Block S130 of the method S100 recites identifying a varietal of the set of produce units based on the set of hyper-spectral features; Block S132 of the method S100 recites estimating a produce quality of the set of produce units based on the set of hyper-spectral features. (Blocks S130 and S132 can similarly recite implementing a product model to identify a varietal and a characteristic of a produce unit based on the spectral profile extracted from a region of the hyper-spectral image depicting the produce unit.) Generally, in Blocks S130 and S132, the computer system can pass the spectral profile of a produce unit (or a group of produce units)—detected in the hyper-spectral image in Block S120—into a product model in order to identity or estimate the class, type, varietal, and/or quality (e.g., freshness, ripeness, bruising) of the produce unit(s). In particular, the computer system can implement a generic product model in Block S130 in order identify a class (e.g., meat, fruit, or vegetable) of a produce unit (or group of produce units) based on a spectral profile extracted from the hyper-spectral image. The computer system can also implement this generic produce module, class-specific produce models, or a type-specific produce model in Blocks S130 and S132: to identify a type (e.g., beef or chicken for a class of meat; apple or orange for a class of fruit) and/or varietal (e.g., a cut for types of beef; Red Delicious or Gala for types of apples) of a produce unit (or group of produce units); and to derive characteristics of this produce unit (or group of produce units) based on this spectral profile of the produce unit(s).

9.1 Class, Type, and Varietal Examples

In one example, the computer system can leverage a produce model to identify and distinguish multiple predefined classes of products—including meats, fruits, and vegetables—based on spectral profiles of produce units in these products. In this example, for the "meat" class, the computer system can distinguish multiple product types, such as including chicken, beef, fish, and pork. The computer system can further distinguish between chicken breast, leg, and wing, skin-on or off, and/or cooked, marinated, raw, and frozen chicken based on the spectral profile of a produce unit of the "chicken" type in the "meat" class. Similarly, the computer system can distinguish between steak, ground chuck, ribs, and tenderloin, and/or cooked, marinated, raw, and frozen beef based on the spectral profile of a produce unit of the "beef" type in the "meat" class.

For a produce unit in the meat class, the computer system can leverage the produce model (or a different produce quality model specific to the meat class) to further derive a set of characteristics specific to the meat class, such as: fat and protein content of a produce unit; a degree of oxidation of the surface of the produce unit; whether the produce unit is rancid; and/or a predicted number of days until the produce unit has reached expiration of its shelf life (e.g., under current storage conditions in the store).

In the "vegetable" class, the computer system can leverage the produce model to distinguish multiple produce types, such as including potatoes, lettuce, eggplant, onion, carrots, squash, etc. The computer system can further distinguish between russet, sweet, red, white, and purple potatoes based on the spectral profile of a produce unit of the "potato" type in the "vegetable" class. Similarly, the computer system can further distinguish between arugula, Batavia, endive, butter, Frisée, Mesclun, Romaine, and other lettuces based on the spectral profile of a produce unit of the "lettuce" type in the "vegetable" class.

In the "fruit" class, the computer system can leverage the produce model to distinguish multiple product types, including apple, citrus, melon, tomato, peach, plum, avocado, etc. The computer system can further distinguish between McIntosh, Fuji, Red Delicious, Gala, Crispin, Braeburn, Honeycrisp, and Jonagold apples based on the spectral profile of a produce unit of the "apple" type in the "fruit" class. Similarly, the computer system can further distinguish between grapefruit, kumquat, lemon, lime, orange, mandarin, tangerine, Satsuma, and other citrus fruits based on the spectral profile of a produce unit of the "citrus" type in the "fruit" class.

For a produce unit in the vegetable or fruit class, the computer system can leverage the produce model (or a different produce quality model specific to the vegetable or fruit class) to further derive a set of characteristics specific to the vegetable or fruit class, such as: ripeness (e.g., % of ripeness); whether a produce unit in under- or overripe; a time to peak ripeness (e.g., a prediction for a number of days until the produce unit is at peak ripeness under current storage conditions in the store); whether mold or other biological matter is present on the produce unit; whether any superficial or internal part of the produce unit is rotten; whether the produce unit is damaged (e.g., "bruised"); and/or nutrient content of the produce unit. (The computer system can also leverage the produce model to derive a set of characteristics specific to a type or varietal of vegetable, fruit, or meat.)

However, the computer system can leverage a produce model to detect any other type or combination of classes, types, varietals, and/or characteristics of produce units depicted in a hyper-spectral image.

9.2 Non-Parametric Product Identification and Characterization

Figure 3:
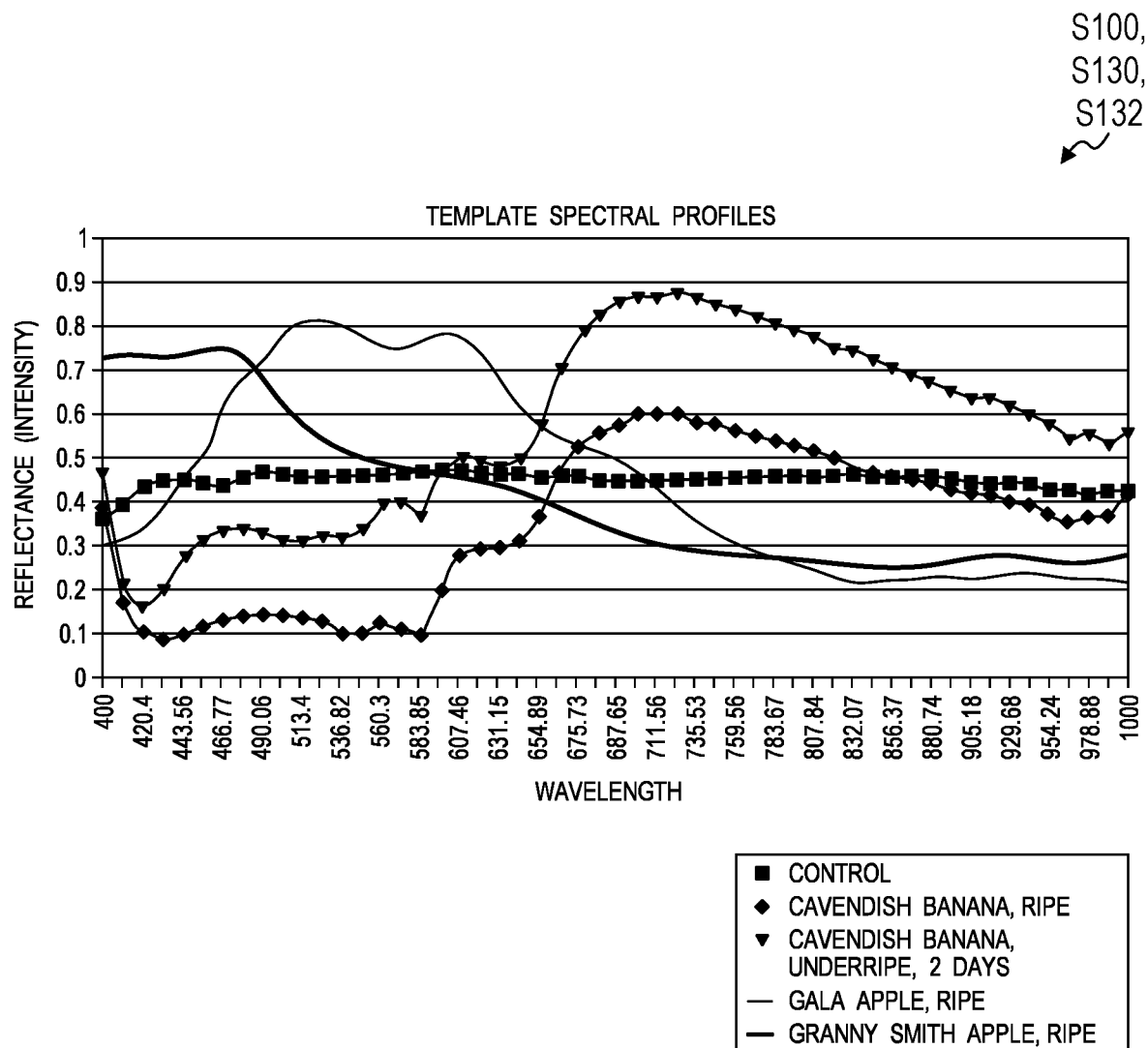
FIG. 3 is a schematic representation of one variation of the method.

In one implementation shown in FIG. 3, the computer system implements a non-parametric product model to identify and characterize a produce unit depicted in the hyper-spectral image. For example, in this implementation, the computer system can access one product model for each class of produce unit specified for monitoring in the store. In this example, a non-parametric class model can include a hyper-spectral "template" image, template histogram, or other non-parametric representation of spectral reflectance intensities or spectral reflectance intensity ranges—across a range of wavelengths in the electromagnetic spectrum—that are characteristic of products in this class.

In this implementation, the computer system can also implement one non-parametric type model characteristic of each product type—within a product class—specified for tracking and monitoring within the store. For example, each non-parametric type model can include a hyper-spectral "template" image or generic, non-parametric representation of frequencies or amplitudes of wavelengths of electromagnetic radiation—across a range of electromagnetic wavelengths—typically reflected by produce units of this type. Furthermore, the computer system can implement one non-parametric varietal model characteristic of each varietal of product—within a product type—specified for tracking and monitoring within the store. For example, each non-parametric varietal model can include a hyper-spectral "template" image or generic, non-parametric representation of frequencies or amplitudes of wavelengths of electromagnetic radiation—across a range of electromagnetic wavelengths—typically reflected by produce units of this varietal.

The computer system can also implement one non-parametric characteristic model of each discrete state of a varietal specified for detection and tracking within the store. For example, each non-parametric characteristic model can include a hyper-spectral "template" image that represents frequencies or amplitudes of wavelengths of electromagnetic radiation typically reflected by produce units of a particular varietal, in a particular state, and/or of a particular quality. For example, the computer system can access and implement hyper-spectral template histograms or template spectral profiles for "underripe by three days," "underripe by two days," "underripe by one day," "ripe," "overripe by one day," "overripe by two days," "spoiled or rotten", and "moldy" for specific varietals of fruits and vegetables or for fruits and/or vegetables generally. Similarly, the computer system can access and implement hyper-spectral template histograms or template spectral profiles for "fresh," "rancid," "low-fat," "moderate-fat," "high-fat," "low-water content," "moderate-water content," and "high-water content" for specific varietals of meats or for meats generally.

In this implementation, upon extracting a spectral profile of a produce unit (or group of produce units) from a hyper-spectral image, the computer system can compare this spectral profile to each available class model and thus isolate a particular class model that exhibits greatest similarity to the spectral profile of the produce unit (or group of produce units). The computer system can then compare the spectral profile to each type model and thus isolate a particular type model that exhibits greater than a threshold similarity to the spectral profile or that exhibits greatest similarity to the spectral profile of all type models for the determined class of the produce unit. Subsequently, the computer system can compare the spectral profile to each varietal model and thus isolate a particular varietal model that exhibits greater than a threshold similarity to the spectral profile or that exhibits greatest similarity to the spectral profile of all varietal models for the determined type of the produce unit.

Furthermore, the computer system can compare the spectral profile of the produce unit(s) to each characteristic model in order to isolate one or more current states (e.g., "overripe by one day and moldy") that exhibit greater than a threshold similarity to the spectral profile or that exhibit greatest similarity to the spectral profile of all characteristic models for the determined varietal of the produce unit.

In a similar implementation, after accessing a hyper-spectral image in Block S112, the computer system can: detect a set of produce units depicted in the hyper-spectral image; define a region of the first hyper-spectral image depicting this set of produce units; and identify a representative pixel cluster in this region of the hyper-spectral image in Block S120. In Block S120, the computer system then extracts a spectral profile from the representative pixel cluster based on pixel values (e.g., pixel intensities)—across a range of wavelengths represented in the hyper-spectral image—of pixels contained within the representative pixel cluster selected in the region of the hyper-spectral image. In Block S132, the computer system then accesses a set of template spectral profiles, wherein each template spectral profile in the set defines characteristic pixel values—across this set of wavelengths—representative of a particular varietal. The computer system can then implement template matching, pattern matching, or other techniques to identify a particular template spectral profile—in the set of template spectral profiles—depicting characteristic pixel values that best approximate pixel values in the spectral profile extracted from the hyper-spectral image; and label the set of produce units depicted in the hyper-spectral image with the varietal represented by the particular template spectral profile.

9.3 Parametric Product Identification and Characterization

Alternatively, the computer system can implement one or more parametric product models to identify a class, type, varietal, and/or quality of one produce unit or a group of produce units depicted in a hyper-spectral image. In this variation, the computer system can implement one parametric class model that predicts a particular product class based on a spectral profile of a produce unit, such as: by outputting similarity scores for the spectral profile and a set of predefined product classes; or by outputting an identifier of a particular product class associated with a greatest similarity score for the spectral profile across the set of predefined product classes. In this variation, the computer system can also implement multiple parametric type models, including at least one parametric type model per product class. Each parametric type model can predict a particular product type based on a spectral profile of a produce unit, such as: by outputting similarity scores for the spectral profile and a set of predefined product types within one product class; or by outputting an identifier of a particular product type associated with a greatest similarity score for the spectral profile across the set of predefined product types within one product class.

Furthermore, in this variation, the computer system can implement multiple parametric varietal models, including at least one parametric varietal model per product type. Each parametric varietal model can predict a particular product varietal based on a spectral profile of a produce unit, such as: by outputting similarity scores for the spectral profile and a set predefined product varietal within one product type; or by outputting an identifier of a particular product varietal associated with a greatest similarity score for the spectral profile across the set of predefined product varietal within one product type within one product class.

Each parametric varietal model can also predict additional characteristics of a produce unit of this class, type, and varietal, such as ripeness level, presence of mold, whether as described above. Alternatively, the computer system can implement multiple parametric varietal characteristic models, including at least one parametric varietal characteristic model per product varietal commonly or currently stocked in the store or generally available in stores within a geographic region containing the store. Each parametric varietal characteristic model can predict a set of characteristics of a particular product varietal based on a spectral profile of a produce unit, such as: by outputting similarity scores for the spectral profile and a set of predefined varietal characteristics for one product varietal within one product type and product class.

For example, in this variation, each of the foregoing class, type, varietal, and/or varietal characteristic models can include a support vector classifier with modified standard normal varietal preprocessing trained on a corpus of hyper-spectral images labeled with the classes, types, varietals, and/or varietal characteristics of produce units depicted in these hyper-spectral images. (In this variation, the computer system can also activate and deactivate class, type, and varietal models based on products that are currently in season and/or based on products that have been recently shipped to, delivered to, and/or stocked in the store.)

Alternatively, the computer system can implement one global parametric model that outputs class, type, varietal, and/or varietal characteristic predictions of a produce unit based on a spectral profile of the produce unit. For example, this global parametric model can include a support vector classifier with modified standard normal varietal preprocessing trained on a corpus of hyper-spectral images labeled with the classes, types, varietals, and/or varietal characteristics of produce units depicted in these hyper-spectral images.

9.4 Variation: Location-Based Product Model Selection

In one variation, the computer system can rank or filter available product models—for subsequent comparison to a spectral profile extracted from a hyper-spectral image—based on the location of the robotic system (or the fixed camera module) within the store when the hyper-spectral image was recorded and based on product classes, types, and/or varietals assigned to produce displays near this location by the planogram of the store.

9.4.1 Location-Based Non-Parametric Product Model Selection

For example, in the variation described above in which the computer system implements non-parametric product models, the computer system can: detect and extract a spectral profile of a produce unit from a hyper-spectral image recorded by the robotic system during a last scan cycle; retrieve the location and orientation of the robotic system—in a store coordinate system—at the time the robotic system recorded the hyper-spectral image; project the position of the produce unit detected in the hyper-spectral image onto a planogram of the store based on the known position of the hyper-spectral camera on the robotic system and the position and orientation of the robotic system in the store when the hyper-spectral image was recoded; and thus isolate a particular slot defined in the planogram currently occupied by this produce unit. The computer system can then: retrieve a varietal-level product model associated with a particular class, type, and varietal of a particular product assigned to the particular slot by the planogram; calculate a degree of similarity between the spectral profile of the produce unit and the varietal-level product model of the particular product (e.g., in the form of a "similarity score"); and then identify the produce unit as of the class, type, and varietal of the particular product assigned to this slot if the degree of similarity (or similarity score) exceeds a threshold (e.g., 70%).

However, if the similarity score for the spectral profile and the varietal-level product model is less than the threshold, the computer system can query the planogram for particular classes, types, and/or varietals of products assigned to other slots and produce displays nearby the particular slot, such as unique varietals assigned as the ten slots physically nearest the particular slot or assigned to slots within a five-meter radius of the particular slot. The computer system can then retrieve varietal-level product models for these additional varietals and repeat foregoing methods and techniques to calculate similarity scores for the spectral profile of the produce unit and the varietal-level product models of these other products. If the similarity score for a second varietal in this set of additional varietals exceeds the threshold, the computer system can thus identify the produce unit as of the corresponding class, type, and varietal.

In another implementation, if the computer system fails to match the spectral profile of the produce unit to a varietal-level identification model of a product assigned to the particular slot currently occupied by the produce unit, the computer system can: retrieve a particular type of the product assigned to the particular slot; and calculate a similarity score between the spectral profile of the produce unit and a particular type-level product model for particular type of the product. The computer system can then verify the type of the produce unit if this similarity score exceeds a threshold or implement a class-level product model to determine the class of the produce unit and then the type of the produce unit if the similarity score between the spectral profile and the particular type-level product model is less than the threshold.

Upon confirming the type of the produce unit, the computer system can then: access a set of varietal-level identification models for varietals of the particular type (and known to be present or otherwise recently delivered to the store); and repeat foregoing methods and techniques to calculate similarity scores for these varietal-level identification models and the spectral profile of the produce unit to either. (Alternatively, the computer system can identify the produce unit as unknown responsive to low similarity scores between many or all available varietal-level identification models and the spectral profile of the produce unit.)

Therefore, in this variation, the computer system can focus a search for the class, type, varietal, and state of a produce unit detected in a hyper-spectral image recorded by the robotic system by first comparing the spectral profile of the produce unit to a varietal-level identification model for the particular class, type, and varietal of product assigned to a particular slot—defined in the planogram—that intersects the location of the produce unit detected in the hyper-spectral image. Responsive to failure to verify a match between the spectral profile and this varietal-level identification model, the computer system can expand the set of varietal-level identification models it compares to the spectral profile in search of a match, both by physical proximity and by taxonomy. In particular, the computer system can: expand the set of varietal-level identification models to include varietal-level identification models of other products assigned to other physical slots nearby the particular slot containing the produce unit; and/or expand the set of varietal-level identification models to include varietal-level identification models of other products of the same type (or, more broadly, of the same class) as the product assigned to the particular slot containing the produce unit; etc. until the computer system matches the spectral profile to a varietal-level identification model of a particular product and thus determines the class, type, and varietal of the produce unit.

9.4.2 Location-Based Parametric Product Model Selection

In the implementation described above in which the computer system executes parametric product models, the computer system can implement similar methods and techniques to: leverage the planogram of the store to predict a particular class, type, and varietal of the produce unit based on the location of the produce unit in the hyper-spectral image and based on the position and orientation of the robotic system when the hyper-spectral image was recorded; select a particular parametric varietal model configured to detect a set of varietals including the particular varietal of the produce unit predicted by the planogram; and then pass the spectral profile into this particular parametric varietal model to verify the class, type, and varietal of the produce unit and to derive characteristics of the produce unit. However, if the particular parametric varietal model outputs low similarity scores for the hyper-spectral image and all varietals represented by this parametric varietal model, the computer system can then implement methods and techniques similar to those described above to: select additional parametric varietal models for types of products assigned— by the planogram—to other slots near the particular slot occupied by the produce unit; to pass the spectral profile of the produce unit into these additional parametric varietal models; and to then identify the produce unit as of a particular class, type, and varietal based on similarity scores output by these additional parametric varietal models.

In yet another example, in the implementation described above in which the computer system executes a global parametric model to transform a spectral profile into a class, type, varietal, and/or state of the produce unit, the computer system can feed a varietal, type, and/or class of the produce unit predicted by the planogram into the global parametric model; the global parametric model can then prioritize pathways for identifying the class, type, and varietal of the produce unit based on this initial planogram-based prediction.

9.5 Multiple Produce Units and Slot Delineation

The computer system can execute the foregoing process for each produce unit detected in the hyper-spectral image. The computer system can then: generate a "map" of classes, types, varietals, and characteristics of produce units depicted in this hyper-spectral image; compare classes, types, and varietals of produce units indicated in this map to the planogram of the store in order to identify deviations from a target stock state of the store; compare characteristics of produce units indicated in this map to target produce unit characteristics for these varietals in order to identify deviations from target qualities of perishable goods stocked in the store; and then selectively distribute prompts and data to associates of the store accordingly.

In one implementation, the computer system further delineates discrete slots based on proximity of produce units of the same class, type, and varietal. For example, for a hyper-spectral image of a produce display housing multiple abutting bins containing produce units that may shift and intermingle over time (e.g., two abutting bins containing stacks of Civni and Gala apples, which exhibit similar appearances when ripe), the computer system can: implement the foregoing methods and techniques to identify and characterize each produce unit depicted in the hyper-spectral image; identify clusters of produce units of the same class, type, and varietal detected in the hyper-spectral image; and estimate slot divisions between these bins in the produce display based these estimates boundaries between clusters of produce units of the same classes, types, and/or varietals.

The computer system can also characterize variance within a delineated slot or cluster of like produce units in multiple dimensions, such as variance of: produce units of different classes (e.g., fruits and vegetables); produce units of different types within the same class (e.g., apples and oranges); produce units of the same type but different varietals (e.g., Gala and Red Delicious apples); and/or produce units of the same varietal but different characteristics (e.g., ripe, underripe, rotten, and bruised Gala apples). The computer system can then: characterize "crispness" (or, "straightness," linearity) of a boundary between two groups of produce units of different classes, types, or varietals located in two adjacent slots in the produce display, which may indicate "orderliness" of these slots and the produce display more generally; and then selectively prompt a store associate to reorganize these groups of produce units in these slots in Block S142 if the boundary therebetween deviates from linear by more than a threshold curvature or if these slots are otherwise disorderly.

The computer system can additionally or alternatively: detect presence of an outlier varietal in a cluster of produce units of the same varietal and/or detect presence of an outlier characteristic (e.g., rotten, underripe, moldy) in a cluster of produce units of the same varietal and otherwise exhibiting similar characteristics in Block S132; and selectively prompt a store associate to remove this outlier produce unit from the slot or produce display accordingly in Block 142 described below. However, the computer system can extract any other deviation, variance, anomaly, or other characteristics of a group of produce units occupying one or more slots in a produce display depicted in the hyper-spectral image.

9.6 Variation: Product Groups

In one variation, rather than identify one produce unit, extract a spectral profile of this one produce unit, and then determine a class, type, varietal, and characteristics of this one produce unit, and then repeat this process for other produce units depicted in the hyper-spectral image as described, the computer system extracts one or more characteristic spectral profiles of a region of the hyper-spectral image depicting one slot and then executes the foregoing processes to derive a list of classes, types, varietals, and/or characteristics of the group of produce units present in this slot.

In one implementation, the computer system: projects a slot map—such as defined by the planogram—onto the hyper-spectral image based on a known location and orientation of the robotic system (or the fixed camera module) in the store when the hyper-spectral image was recorded; and thus defines bounds of slots within a product display depicted in the hyper-spectral image. The computer system can then: isolate a region of the hyper-spectral image corresponding to a particular slot; implement a product model to characterize pixels as either "product" or "not product"; and implement methods and techniques described above to calculate a spectral profile for all produce units depicted in this region of the hyper-spectral image or to calculate spectral profiles for individual produce units depicted in this region of the hyper-spectral image.

In another implementation, the computer system implements a product model to characterize pixels in the hyper-spectral image (or in a particular slot identified in the hyper-spectral image) as either "product" or "not product." For all pixels characterized as "product," the computer system can then identify clusters of pixels exhibiting high similarity (i.e., low variance) across all hyper-spectral channels within the hyper-spectral image. For each cluster, the computer system can: calculate a spectral profile that characterizes the cluster of pixels; implement methods and techniques described above to determine a class, type, varietal, and/or characteristics of produce units represented by the cluster of pixels based on the spectral profiles representing the cluster; and label each individual pixel in the cluster (or the cluster of pixels more generally) in the hyper-spectral image with this determined class, type, varietal, and/or characteristics. The computer system can thus generate a map (e.g., a "pixel map") containing pixel-level class, type, varietal, and/or characteristic labels for surfaces of produce units depicted in the hyper-spectral image.

The computer system can also calculate variance of class, type, varietal, and/or characteristic labels across this region of the hyper-spectral image, such as in the form of a heatmap. For example, the computer system can calculate variance of class, type, varietal, and/or characteristic labels applied to pixels across this region of the hyper-spectral image. Based on this variance, the computer system can: distinguish slots containing produce units of different varietals and/or characteristics (e.g., ripeness level); characterize orderliness of these slots or the produce display more generally; and detect produce units of outlier varietals and outlier characteristics in a particular slot or across the produce display more generally.

9.7 Variation: Shelf Labels

In another variation shown in FIG. 2, the computer system implements barcode detection, optical character recognition, pattern matching, template matching, and/or other methods and techniques: to detect a product label (e.g., a "shelf tag") on a shelf within the hyper-spectral image (or within a concurrent color image recorded by the robotic system or by the fixed camera module); to detect a barcode, QR code, SKU value, product description, and/or other product identifier in this product label; and to extract a product identifier from the product label (e.g., by implementing optical character recognition or barcode decoding techniques) accordingly. In this variation, the computer system can then: select a product model associated with this product identifier (e.g., this barcode value, QR code value, SKU value, or product description); and compare a spectral profile of a produce unit (or group of produce units)—extracted from a region of the hyper-spectral image adjacent this product label and depicting this produce unit (or group of produce units)—to this product model in order to confirm that the produce unit (or group of produce units) matches the class, type, and/or varietal specified by the product label. If the computer system confirms that the produce unit (or group of produce units) matches the class, type, and/or varietal specified by the product label, the computer system can implement the same or other product model to identify a characteristic of this produce unit (or group of produce units) based on this spectral profile.

However, in this variation, if the computer system fails to confirm that the produce unit (or group of produce units) matches the class, type, and/or varietal specified by the product label, the computer system can: scan the hyper-spectral, concurrent color image, and/or other hyper-spectral and/or color images recorded nearby for other product labels; implement similar methods and techniques to identify products represented by these other product labels and to retrieve corresponding product models; and compare these other product models to the spectral profile of the produce unit (or group of produce units) in order to identify and characterize the produce unit (or group of produce units).

Therefore, in this variation, the computer system can: access a photographic image—of a produce display—recorded approximately concurrently with a hyper-spectral image in Block S116; detect a display tag in the photographic image; and read an identifier of a varietal of produce units—in a produce display depicted in the color image and the concurrent hyper-spectral image—from the display tag in order to identify a varietal of produce units stocked in the produce display in Block S130. The computer system can then: retrieve a produce quality model associated with this varietal (e.g., a produce quality model configure to detect ripeness, bruising, spoilage, and mold in fresh fruits and vegetables); extract a spectral profile from a region of the concurrent hyper-spectral image depicting these produce units; and characterize qualities of these produce units based on this spectral profile and the produce quality model in Block S132, such as by passing the spectral profile through the parametric produce quality model or by matching the spectral profile to a non-parametric template profile representing known characteristics.

The computer system can implement similar methods and techniques: to detect and read a shelf tag, printed signage, and/or handwriting (e.g., chalk and chalk board) annotations near a produce display; and to retrieve product models based on data extracted from such signage.

9.8 Produce Unit Delineation

In one variation described, the robotic system (or the fixed camera module) further includes a depth camera (e.g., a time-of-flight sensor, a structured light sensor) that defines a field of view that intersects or overlaps the field of view of the hyper-spectral camera and that is configured to record a depth image (or a 3D point cloud, etc.) of a scene in its field of view. During operation, the robotic system (or the fixed camera module) can record approximately concurrent hyper-spectral images and depth images via the hyper-spectral camera and depth image sensor, respectively. The computer system can then: implement a product model to distinguish individual units of a product within the depth image; project bounds of individual units of a product detected in the depth image onto the hyper-spectral image in order to isolate regions of the hyper-spectral image that represent individual units of the product; and then implement methods and techniques described above to identify and characterize individual produce units depicted in the hyper-spectral image based on a product non-parametric model and spectral profiles extracted from these regions of the hyper-spectral image.

For example, the computer system can: implement a hyper-spectral product model to identify a particular class, type, and/or varietal of a cluster of units of a product within a hyper-spectral image; access a volumetric product model for this particular class, type, and/or varietal of product; project a region of the hyper-spectral image containing this cluster of units into a concurrent depth image to isolate a region of interest in the depth image; and implement this volumetric product model to isolate individual produce units in this region of interest in the depth image. For each individual produce unit detected in this region of interest in the depth image, the computer system can: project bounds of this individual produce unit from the depth image onto the hyper-spectral image; and re-apply the hyper-spectral product model to further extract qualities (e.g., ripeness, freshness, nutrient levels, superficial rot, internal rot) of this individual produce unit. The computer system can thus leverage concurrent hyper-spectral and depth images to identify and characterize individual produce units within the store.

The computer system can additionally or alternatively extract a volumetric distribution of the produce units occupying the produce display from this depth image. For example, the computer system can: scan the depth image for (approximately) planar surfaces; detect non-planar surfaces near these planar surfaces; interpret planar surfaces adjacent and offset outwardly from the non-planar surfaces—as a front and/or side(s) of the produce display; and identify non-planar surfaces—inset from the front and/or side(s) of the produce display as a group of produce units. In this example, the computer system can also: derive a height map or height gradient of produce units within this produce display from the depth image; and interpret orderliness of the produce display based on this height map, such as proportional to linearity and horizontalness of the top row of produce units or proportional to proximity of the height map to a target gradient (e.g., in the form of a shallow convex hull). Then, if such derived orderliness of produce units in this produce display falls outside of a threshold range, the computer system can dispatch a store associate to straighten or otherwise rectify the produce display.

Therefore, in this implementation, the computer system can: extract a volumetric distribution of a set of produce units from a depth image; calculate a difference between this volumetric distribution and a target volumetric distribution of produce units assigned to the produce display by a planogram of the store; and serve a prompt to a computing device, assigned to an associate of the store, to reorganize the produce display in response to this difference exceeding a predefined threshold difference.

10. Store Associate Guidance

Block S140 of the method S100 recites, in response to the first varietal differing from a particular varietal assigned to a first slot, occupied by the first produce unit, by a planogram of the store, serving a prompt to an associate of the store to manually return the first produce unit to a second slot assigned to the first varietal by the planogram; and Block S142 of the method S100 recites, in response to the first characteristic falling outside of a range of permitted characteristics predefined for the first varietal, serving a prompt to the associate of the store to manually discard the first produce unit from the first slot. Generally, in Blocks S140 and S142, the computer system can selectively serve prompts to associates of the store to stock and maintain produce displays based on data extracted from the hyper-spectral image in Blocks S130 and S132.

10.1 Intermingling Produce

In one implementation shown in FIG. 4, if the computer system detects an outlier produce unit occupying a particular slot and of a varietal other than assigned to the particular slot by the planogram, the computer system can generate a notification containing a prompt to manually identify and remove the outlier produce unit from the slot. For example, the computer system can populate this notification with: a location or address of the slot in the store; the class, type, varietal of the outlier produce unit, such as in the form of a stock image and/or a product description of the outlier produce unit; a section of a color (e.g., RGB) image of the slot—recorded by the robotic system during the scan cycle—annotated to visually highlight the outlier produce unit (e.g., based on a boundary of the outlier produce unit or positions of outlier pixels projected from the hyper-spectral image onto the color image recorded concurrently by the robotic system); a slot location assigned to varietals of the outlier produce unit by the planogram; and/or a prompt to return the outlier produce unit to its assigned slot. The computer system can then: serve the notification to a computing device assigned to an associate of the store, such as in real-time; or append this notification to a current restock list for the store.

In a similar implementation, if the computer system detects excessive intermingling of produce units of different varietals near a boundary between slots assigned to these varietals, the computer system can generate a notification containing a prompt to tidy produce units in these slots and indicating a location or address of these slots in the store. The computer system can then serve the notification to a computing device assigned to an associate of the store or append this notification to a current restock list for the store, as described above.

In a similar implementation, the computer system can identify a particular produce unit that differs from other produce units nearby in class, type, and/or varietal domains and then prompt an associate to remove this particular produce unit from the produce display accordingly. For example, the computer system can implement methods and techniques described above to identify classes, types, and varietals of individual produce units stock in a produce display based on spectral profiles extracted from regions of a hyper-spectral image depicting these individual produce units. In this example, the computer system can then identify a correct class, type, and varietal of product assigned to this produce display, such as: based on a class, type, and varietal of produce unit detected with greatest frequency in this produce display; based on a product identifier read from a shelf tag, label, or signage detected near the produce display; or based on product details assigned to the produce display in the planogram of the store. The computer system can then: compare classes, types, and varietals of products detected in the hyper-spectral image to the correct class, type, and varietal of product assigned to this produce display in order to identify individual mis-stocked (or "outlier") produce units; and then prompt a store associate to audit the produce display and remove the outlier produce unit accordingly.

In a similar example, the computer system: detects a display tag in a photographic image of a produce display; reads an identifier of a target varietal—allocated to the produce display—from the display tag; extracts a spectral profile from a region of the concurrent hyper-spectral image depicting a produce unit in Block S120; identifies a varietal of the produce unit based on the spectral profile in Block S130; and then generates a prompt to remove the produce unit from the produce display responsive to identifying a difference between the varietal and the target varietal. The computer system can then serve this prompt to a mobile device assigned to or carried by an associate of the store: in real-time; during a next scheduled restocking period in the store; or when the mobile device nears the produce display (e.g., based on a feed of geolocations of the mobile device while the associate in working in the store).

10.2 Product Protection

In another implementation shown in FIGS. 2 and 4, if the computer system detects an outlier produce unit occupying a particular slot and characterized by a defect (e.g., presence of mold, rot, excessive bruising, or possibility of being rancid), the computer system can generate a notification containing a prompt to manually identify and remove the outlier produce unit from the slot. For example, the computer system can populate this notification with: a section of a color (e.g., RGB) image of the slot—recorded by the robotic system during the scan cycle—annotated to visually highlight the outlier produce unit, such as described above; a stock image of produce units of this type or varietal exhibiting this same defect (and degree of defect); a location or address of the slot in the store; and a prompt to discard the outlier produce unit. The computer system can then: serve the notification to a computing device assigned to an associate of the store, such as in real-time; or append this notification to a current restock list for the store.

In a similar implementation, the computer system can detect a spoiled, rotting, or moldy produce unit occupying a produce display and immediately prompt a store associate to remove this produce unit in order to reduce opportunity for bacteria or mold to spread from this produce unit to other unspoiled produce units in the produce display. For example, the computer system can: detect a group of produce units in a hyper-spectral image of a produce display; extract a set of spatial spectral features from each region of the hyper-spectral image depicting a produce unit in this group; implement methods and techniques described above to identify a class, type, varietal, and characteristics (e.g., ripeness, presence of mold, indicators of spoilage) of each produce unit in this group based on its spatial spectral features; estimate presence of a spoiled and/or moldy produce unit in the produce display based on these derived data; generate a prompt to remove spoiled and/or moldy produce units from this produce display in response to detecting a single spoiled or moldy produce unit in the produce display; and then immediately serve this prompt to a store associate, such as a particular store associate currently nearest this produce display or currently assigned to a section of the store occupied by this produce display.

10.3 Quality Variance

In another implementation shown in FIG. 4, if the computer system detects a high variance in quality (e.g., ripeness) of produce units of a particular varietal occupying a particular produce display (e.g., a combination of underripe, ripe, and overripe produce units of the same varietal), the computer system can generate a notification containing a prompt to manually sort these produce units by quality, such as by grouping these produce units by ripeness and remove overripe produce units. For example, the computer system can populate this notification with: a location or address of the slot in the store; instruction for distinguishing underripe, ripe, and overripe produce units of this varietal or more generic product type; a prompt to place ripe produce units toward the front or near the center of the slot; a prompt to place underripe produce units toward the rear or near the perimeter of the slot; and/or a prompt to discard overripe produce units. The computer system can then: serve the notification to a computing device assigned to an associate of the store, such as in real-time; or append this notification to a current restock list for the store.

10.4 Quality Threshold

In a another implementation shown in FIG. 4, the computer system can selectively prompt a store associate to audit the produce display in response to detecting more than a threshold proportion or more than an absolute threshold quantity of produce units that deviate from a target quality range specified for this class, type, and/or varietal and/or assigned to the produce display by the planogram.

In one example, if the computer system detects a high proportion (e.g., more than 80%) of overripe produce units within a slot, the computer system can implement processes described above to prompt an associate of the store: to discard produce units in the bin and restock the bin with a fresh set of underripe or ripe produce units of the same varietal; or reduce prices for produce units in the bin, such as by a first proportion (e.g., 20%) for a group of ripe produce units nearing an overripe state and by a second proportion (e.g., 80%) for a group of overripe produce units.

In a similar example, the computer system estimates a range of ripenesses of a set of produce units in a produce display and estimates a proportion (or absolute quantity) of bruised produce units in the produce display based on a produce quality model and a set of spatial spectral features extracted from a hyper-spectral image of the produce display. The computer system then: calculates a quality metric of this set of produce units based on proximity of the range of ripenesses of these produce units to a target ripeness assigned to the produce display—by the planogram—and inversely proportional to the proportion (or absolute quantity) of bruised produce units in this set of produce units in the produce display; and generates a prompt to remove overripe produce units and bruised produce units from the produce display in response to the quality metric of this set of produce units falling below a threshold quality.

In another example, for each produce unit depicted in a hyper-spectral image, the computer system: detects a boundary of the produce unit depicted in the hyper-spectral image; and calculates a spectral profile of pixel values, representing reflectance intensity across a range of electromagnetic wavelengths, of pixels contained within the boundary of the produce unit depicted in the first region of the first hyper-spectral image in Block S120. In this example, the computer system then accesses a set of template spectral profiles, wherein each template spectral profile identifies characteristic pixel values representative of the varietal in a particular ripeness stage within a predefined set of ripeness stages, such as: an underripe stage; a ripe stage; and an overripe stage. For each produce unit in the set of produce units, the computer system then: identifies a particular template spectral profile—from the set—that contains characteristic pixel values approximating pixel values in the spectral profile of the produce unit; and labels this produce unit with a particular ripeness stage represented by the particular template spectral profile accordingly in Block S132. The computer system can then: calculate a proportion of produce units—in the produce display—in the overripe stage; and then generate a prompt to remove produce units in the overripe stage from the produce display if this proportion of produce units in the overripe stage exceeds a threshold proportion (e.g., 5%).

10.5 Volume/Quantity Deviation

In another implementation shown in FIGS. 1 and 4, the computer system estimates a quantity of produce units in a produce display based on a depth image captured by the robotic system (or by the fixed camera module) and then selectively prompts a store associate to restock the produce display when fewer than a minimum quantity of produce units are present in the display. In particular, the planogram can specify a minimum quantity of produce units of a particular product in a produce display such that patrons perceive a sufficient degree of selection options for this product, such as: four steaks; six watermelon; eights hands of bananas; and 30 apples. The computer system can then implement the foregoing methods and techniques to estimate quantities of produce units in produce displays throughout the store and then selectively prompt restocking of these produce displays based on such minimum quantities corresponding to their assigned products.

10.6 Restocking Quantity

The computer system can additionally or alternatively estimate a quantity of produce units to resupply to a produce display based on: a quantity of estimated produce units currently occupying the produce display based on features extracted from a hyper-spectral image and/or a depth image of the produce display; a quantity of low-quality produce units recommended for removal from the produce display based on features extracted from a hyper-spectral image and/or a depth image of the produce display; and/or a target quantity (or volume) of produce units allocated to the produce display in a "fully-stocked" condition by the planogram of the store. In this implementation, the computer system can then return this quantity of produce units to resupply to the produce display to a store associate when prompting or scheduling the store associate to audit the produce display, thereby enabling the store associate to retrieve all needed stock before arrival at the produce display rather than require the store associate to first audit the produce display, retrieve needed stock, and then resupply the produce display.

For example, the computer system can distinguish underripe produce units, ripe produce units, and overripe produce units in a set of produce units depicted in a hyper-spectral image based on one or more spectral profiles extracted from this hyper-spectral image in Block S130. In this example, the computer system can also: access a depth image, of the produce display, recorded approximately concurrently with the hyper-spectral image in Block S114; extract a volumetric representation of the set of produce units from the depth image; and estimate a total quantity of produce units in the set of produce units currently occupying the produce display based on this volumetric representation. The computer system can then predict a quantity of overripe produce units in the produce display at the current time based on (e.g., as a product of) the total quantity of produce units estimated in the produce display and relative proportions of underripe produce units, ripe produce units, and overripe produce units distinguished in the hyper-spectral image. More specifically, the computer system can estimate total quantities of underripe, ripe, and overripe produce units currently occupying the produce display based on a quantities of a subset of these produce units depicted in the hyper-spectral and depth images of the produce display. The computer system can then generate a prompt to remove the quantity of overripe produce units from the produce display—such as including overripe produce units both at the surface and buried in this quantity of produce units occupying the produce display—if qualities of these produce units deviate from a target quality range, such as described above.

In the foregoing example, the computer system can also: calculate a difference between the total quantity of produce units in the produce display and a target quantity of produce units of this varietal assigned to the produce display by the planogram of the store; and calculate a restocking quantity based on a sum of this difference and the quantity of overripe produce units designated for removal from the produce display. Accordingly, the computer system can append this restocking quantity of produce units of this varietal to the prompt to restock the produce display.

10.7 Restock Timing

In another implementation, the computer system can leverage qualities of produce units in a produce display—derived from multiple hyper-spectral images recorded over time—to estimate a rate of change of qualities of such products in the store. The computer system can then predict a future time at which produce units in a produce display will deviate from a threshold condition or target quality range based on this quality rate of change and then schedule audit or restocking of the produce display accordingly.

For example, after executing the foregoing methods and techniques to characterize qualities of a first set of produce units of a first varietal in a produce display based on a first spectral profile extracted from a first hyper-spectral image of the produce display recorded at a first time in Block S132, the computer system can: access a second hyper-spectral image—of the produce display—recorded by the fixed camera module (or by the robotic system) at a second time succeeding the first time (e.g., by one hour, one day); extract a second spectral profile from a second region of the second hyper-spectral image depicting a first subset of the first set of produce units occupying the produce display at the second time; characterize qualities of the first subset of the first set of produce units in the produce display based on the second spectral profile; and estimate a rate of change in quality of the first varietal of these produce units—such as specifically under conditions at the store over this period of time—based on differences between qualities of the first set of produce units at the first time and qualities of the first subset of produce units at the second time.

The computer system can then extrapolate current qualities of the first subset of produce units at the second time to a future time based on this rate of change in quality of the first varietal. For example, the computer system can: predict overripeness of a second subset (e.g., a threshold proportion; 5%) of the first set of products in the produce display at a third time succeeding the second time based on the rate of change and the current quality of the first subset of produce units; and then schedule restocking of the produce display with a second set of ripe or underripe produce units of the first varietal prior to this third time. The computer system can thus preemptively schedule audit and restocking of produce units in a produce display based on their qualities and a derived rate of change in qualities of produce units of this class, type, or varietal at the store in order to prevent instances of too many (absolutely or proportionally) overripe produce units in a produce display.

10.8 Live Guidance

In another implementation in which a fixed camera module is installed in the store facing a produce display, the computer system can: access a feed of hyper-spectral and color images captured by this fixed camera module; implement methods and techniques described above to identify and characterize produce units depicted in these hyper-spectral images; identify outlier or anomalous (e.g., moldy, overripe, rotting) produce units in these hyper-spectral images; project locations of outlier or anomalous produce units detected in the hyper-spectral images onto concurrent color images based on a known offset between the hyper-spectral camera and the color camera in the fixed camera module; annotate these locations in these color images to indicate these outlier or anomalous produce units; and serve (or "stream") these annotated color images in (near) real-time to a mobile device (e.g., a smartphone, a tablet) carried by a store associate with a prompt to remove the highlighted produce units. The store associate may then view this (nearly) live annotated color image feed for guidance when searching for outlier or anomalous produce units designated for removal from the produce display. As the store associate rummages through the produce display, the computer system can repeat the foregoing process to identify, characterize, and flag additional outlier or anomalous produce units thus exposed by the store associate and depicted in subsequent hyper-spectral and color images recorded by the fixed camera module. Once the computer system detects absence of additional outlier or anomalous produce units in the hyper-spectral image feed, the computer system can return—to the associate's mobile device—confirmation of rectification of the produce display.

Therefore, in this implementation, the computer system can access a live feed of hyper-spectral and/or color images captured by a fixed camera module, detect outlier or anomalous produce units in these images, and return live visual guidance to a store associate to assist the store associate in identifying and removing these outlier and anomalous produce units.

The computer system can implement similar methods and techniques to generate live guidance for a store associate auditing a produce display based on a feed of hyper-spectral and/or color images recorded by the robotic system while the robotic system is present on the store floor and facing this produce display.

11. Patron Support

In one variation, the computer system can implement similar methods and techniques to serve produce unit information—extracted from hyper-spectral images recorded by the robotic system during a last scan cycle—to patrons of the store, such as ripeness levels, predicted time (e.g., in days) to peak ripeness, and/or nutrient levels of produce units stocked in product displays throughout the store.

For example, the computer system can serve these data to a digital display located in a produce section of the store; the digital display can then scroll through frames depicting ripeness level, peak ripeness predictions, and locations of various products currently available in the store. In another example, the computer system can serve information for a particular product to a digital display located near a slot loaded with produce units of this particular product; and this digital display can render price, varietal description, ripeness, and nutrient information derived from a region of a last hyper-spectral image recorded by the robotic system and depicting this slot.

For example, a fixed camera module can be installed over and facing a produce display below, and a digital display can be arranged near the produce display, such as hanging from a ceiling directly over the produce display, mounted to the produce display, or mounted to a floor stand adjacent the produce display. In this example, the computer system can: access a hyper-spectral image recorded by the fixed camera display in Block S120; extract a spectral profile from the hyper-spectral image in Block S120; estimate an average ripeness (e.g., "underripe by three days," "underripe by two days," "underripe by one day," "ripe," or "overripe") of a set of produce units occupying the produce display based on this spectral profile in Block S130; predict an average time to peak ripeness (e.g., "three days," "two days," "today," "best for pie or jam") for this set of produce units based on the average ripeness; and then update the digital display to indicate the average ripeness and/or the average time to peak ripeness for these produce units. A patron shopping for produce in this produce display may then view this digital display for information regarding: the current ripeness of the produce units; a "best" time to consume these produce units at peak ripeness; and/or alternative consumption options of these produce units are overripe.

Alternatively, the computer system can store produce unit information derived in Blocks S130 and S132 in a remote database and link these data to a product identifier of a product assigned to this produce display. Furthermore, a QR code, barcode, or other identifier can be located on individual produce units (e.g., on stickers placed on these produce units) occupying this produce display. A patron may then scan the QR code with her mobile device (e.g., her smartphone) or manually enter the identifier into a native application or web browser executing on her mobile device. The patron's mobile device can then: automatically retrieve ripeness and other product information associated with this identifier from the remote database; and render this ripeness information for the patron.

In another implementation, while the robotic system is operating within the store, a patron may walk up to the robotic system and present a produce unit to the robotic system. The robotic system can then record a hyper-spectral image of the produce unit through a hyper-spectral camera, such as automatically or responsive to an oral command from the patron. The computer system (or the robotic system) can then execute the foregoing methods and techniques to extract the class, type, varietal, and characteristics of the produce unit from this hyper-spectral image. The robotic system can then render a report for this produce unit on a display integrated into the robotic system. For example, for the produce unit that is a fruit or vegetable, the computer system can automatically determine: a class, type, and/or varietal of the produce unit; a ripeness level (e.g., % of ripeness, or overripe); a number of days to peak ripeness; whether mold or other biological matter is present on the produce unit; and/or whether any part of the produce unit is rotten from the hyper-spectral image. The robotic system can then render this information on its integrated display. Alternatively, the robotic system can render a short URL or QR code—linked to a website or database containing this data about the produce unit and recipes containing the fruit or vegetable—on its integrated display. The user may type the short URL into a web browser or scan the QR code with her mobile device (e.g., a smartphone) to access these data specific to this produce unit.

In another implementation, a patron-facing fixed camera module is installed in the store, such as near a scale or bag dispenser in a produce department in the store. In this implementation, a patron may collect various produce units from produce displays in this section and add these produce units to her shopping cart. Before exiting the produce section, the patron may present these produce units to a patron-facing fixed camera module, such as individually or en masse. The computer system can then: access a hyper-spectral image recorded by this fixed camera module; and execute methods and techniques described above to identify and characterize produce units depicted in this hyper-spectral image. For example, for each class, type, and varietal of produce unit detected in the hyper-spectral image, the computer system can retrieve or derive: a product identifier (e.g., a SKU); a product description (e.g., a class, type, and varietal of the produce unit); an origin of the produce unit (e.g., a farm location, a farmer story), batch data (e.g., delivery date, batch number, lot number); ripeness; an estimated time to peak ripeness; confirmation of absence of mold; and/or recipe suggestions; etc. of the produce unit. The computer system can then return these product information to a digital display integrated into or arranged near the fixed camera module, and this digital display can present these information to the patron in (near) real-time, thereby enabling the patron to rapidly access information pertinent to either purchasing these produce units, replacing these produce units with alternative examples, or electing a different class, type, or varietal of produce.

12. Checkout

In a similar variation, a fixed camera module is arranged at a checkout counter in the store, and the computer system implements similar methods and techniques to access a hyper-spectral image captured by this fixed camera module, to identify and characterize produce units depicted in this hyper-spectral image, and to return these identity and characteristic information to a clerk and/or a patron as the patron checks out at the store.

For example, rather than require a clerk (or the patron) to find and scan barcodes on stickers applied to individual fresh produce units, manually enter codes from these stickers into a checkout interface, or search through a database to find a product page for a produce unit at the checkout interface, the clerk (or the patron) may instead present a produce unit to the fixed camera module, which captures a hyper-spectral image of this produce unit. The computer system can then: access this hyper-spectral image; execute the foregoing methods and techniques to identify a class, type, varietal, and/or SKU of a produce unit depicted in this hyper-spectral image; retrieve pricing and promotional data for this SKU; execute the foregoing methods and techniques to identify characteristics (e.g., ripeness, damage) of this produce unit depicted in the hyper-spectral image; and return these identity, pricing, promotion, and characteristic information to the checkout interface. Thus, in addition to identifying the produce unit and returning pricing information for this produce unit to the checkout interface, the computer system can also supply pertinent information regarding the quality of the produce unit to the checkout interface, thereby prompting the clerk to either confirm the quality of the produce unit before selling the produce unit to the patron or prompting the patron to replace a lower-quality produce unit with a higher-quality produce unit and thus better ensuring that the patron is satisfied with her purchase at the store.

13. Variation: Back of Store

In one variation, the computer system dispatches the robotic system to scan inventory in the back of the store during a scan cycle. In this variation, the computer system can then implement similar methods and techniques to identify which batches of produce units to: discard generally due to defects (e.g., mold, overripeness, excessive bruising); to deploy to the front of the store given proximity to peak or target ripeness; and/or hold in the back of the store due to underripeness. The computer system can then serve this derived information to a manager or associate of the store in order to inform restocking of product at the front of the store.

The computer system can implement similar methods and techniques to identify class, type, varietal, and/or characteristics of produce units in a new shipment of produce units to the store, to verify that these produce units match a label or indicated identity on the new shipment, and to serve confirmation of the new shipment or a notification that the new shipment is incorrect to a store associate, manager, or administrator accordingly.

For example, a fixed camera module can be installed over or arranged near a receiving dock at the store and can capture hyper-spectral images of produce bins delivered to the store during delivery events. In this example, the computer system can: access hyper-spectral images—of a produce bin—recorded by the fixed camera module during delivery of this produce bin to the store; extract a spectral profile from a region of this hyper-spectral image depicting a set of produce units in the produce bin; identify this set of produce units (e.g., based on this spectral profile or based on a barcode or text detected in a concurrent image of the produce bin); and characterize qualities of this set of produce units in the produce display based on this spectral profile. The computer system can then: authorize receipt of this set of produce units in response to qualities of these produce units in the produce bin falling within a target quality range assigned to the first varietal; and vice versa.

In this example, once these produce units are loaded into inventory in the back of the store, the computer system can maintain an estimate of the quality of these produce units, such as: based on additional hyper-spectral images of these produce units recorded by another fixed camera module in the back of the store or by the robotic system during a subsequent scan cycle in the back of the store; or based on the quality of these produce units detected upon arrival at the store and a rate of change in quality of produce at the store calculated by the computer system as described above. The computer system can then generate a prompt to replace produce units in a produce display on the floor of the store with produce units from this produce bin in the back of the store responsive to detecting lower-quality produce units in the produce display and detecting or estimating higher-quality produce units in the produce bin, such as described above.

Furthermore, in this implementation, the computer system can confirm that produce units entering the store meet minimum quality specifications. When verified produce units are later moved from inventory in the back of the store into a produce display on the floor of the store, the computer system can: access a hyper-spectral image of this produce display; derive a quality (e.g., bruising) of these produce units now occupying this produce display; and thus determine whether damage to these produce units occurred while present in the store. More specifically, by executing Blocks of the method S100 to identify and characterize produce units both upon delivery to the store and upon stocking on the floor of the store, the computer system can isolate sources of produce damage following delivery to the store and thus enable a manager or administrator at the store to enforce greater accountability for management of produce within the store. For example, if the computer system confirms quality of produce units delivered to the store based on a hyper-spectral image captured during this delivery and later detects a high rate of bruising in the produce units following loading into a produce display on the floor of the store, the computer system can prompt the store manager or administrator to investigate destructive transfer of produce units of this varietal into produce displays in the store.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of an user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for tracking fresh produce in a store includes:
   accessing, by a processor of a computing system, a first hyper-spectral image, of a produce display in a store, recorded at a first time;
   accessing, by the processor, a first depth image, of the produce display, recorded at approximately the first time;
   extracting, by the processor, a first-spectral profile from a first region of the first hyper-spectral image depicting a first set of produce units in the produce display, the first-spectral profile representing a set of hyper-spectral features;
   extracting, by the processor, a first volumetric representation of the first set of produce units from the first depth image;
   identifying, by the processor, a first varietal of the first set of produce units based on the first-spectral profile;
   characterizing qualities of the first set of produce units in the produce display based on the first spectral profile;
   detecting, by the processor, a first proportion of produce units, in the first set of produce units, in a first ripeness stage and a second proportion of produce units, in first set of produce units, in a second ripeness stage based on the first spectral profile;
   estimating, by the processor, a total quantity of produce units in the first set of produce units occupying the produce display at the first time based on the first volumetric representation;
   predicting, by the processor, a first quantity of produce units in first ripeness stage and occupying the produce display at the first time based on the total quantity of produce units and the first proportion;
   calculating a difference between the total quantity of produce units and a target quantity of produce units of the first varietal assigned to the produce display by a planogram of the store;
   calculating a restocking quantity for the produce display based on the difference and the first quantity of produce units; and
   in response to qualities of the first set of produce units in the produce display deviating from a target quality range assigned to the first varietal, generating a prompt to remove the first quantity of produce units from the produce display and to restock the produce display with the restocking quantity of produce units of the first varietal.

2. The method of claim 1:
   further comprising dispatching a robotic system to autonomously navigate throughout the store during a first scan cycle;
   wherein accessing the first hyper-spectral image comprises accessing the first hyper-spectral image recorded by the robotic system while occupying a first location in the store, proximal the produce display, at the first time.

3. The method of claim 1, wherein accessing the first hyper-spectral image comprises accessing the first hyper-spectral image recorded by a fixed camera module responsive to detecting motion at the first time, the fixed camera module installed proximal the produce display and defining a field of view intersecting the produce display.

4. The method of claim 1:
   wherein accessing the first hyper-spectral image comprises accessing the first hyper-spectral image recorded by a fixed camera module at the first time, the fixed camera module defining a field of view intersecting the produce display;
   further comprising:
   accessing a second hyper-spectral image, of the produce display, recorded by the fixed camera module at a second time succeeding the first time;
   extracting a second spectral profile from a second region of the second hyper-spectral image depicting a first subset of the first set of produce units in the produce display;
   characterizing qualities of the first subset of the first set of produce units in the produce display based on the second spectral profile; and
   estimating a rate of change in quality of the varietal at the store based on differences between qualities of the first set of produce units at the first time and qualities of the first subset of produce units at the second time.

5. The method of claim 4, further comprising:
   predicting overripeness of a second subset of the first set of products in the produce display at a third time succeeding the second time based on the rate of change; and
   scheduling restocking of the produce display with a second set of produce units of the first varietal prior to the third time.

6. The method of claim 1:
   wherein extracting the first spectral profile from the first region of the first hyper-spectral image comprises extracting a set of spatial spectral features from the first region of the first hyper-spectral image;
   wherein detecting the first proportion of produce units in the first ripeness stage comprises estimating the first proportion of bruised produce units, in the first set of produce units, based on the set of spatial spectral features and the produce quality model; and
   wherein generating the prompt comprises:
   calculating a quality metric of the first set of produce units based on proximity of the range of ripenesses to a target ripeness assigned to the produce display and based on the proportion of bruised produce units in the first set of produce units; and
   generating the prompt to remove bruised produce units from the produce display in response to the quality metric of the first set of produce units falling below a threshold quality.

7. The method of claim 1:
   wherein extracting the first spectral profile from the first region of the first hyper-spectral image comprises extracting a set of spatial spectral features from the first region of the first hyper-spectral image;
   wherein characterizing qualities of the first set of produce units in the produce display based on the first spectral profile comprises estimating presence of a spoiled produce unit in the first set of produce units based on the set of spatial spectral features and the produce quality model; and
   wherein generating the prompt comprises generating the prompt to remove the first quantity of produce units from the produce display in response to detecting the spoiled produce unit in the first set of produce units.

8. The method of claim 1:
   wherein extracting the first spectral profile from the first region of the first hyper-spectral image comprises, for each produce unit in the first set of produce units:

detecting a boundary of the produce unit depicted in the first region of the first hyper-spectral image; and calculating a spectral profile of pixel values, representing reflectance intensity across a range of electromagnetic wavelengths, of pixels contained within the boundary of the produce unit depicted in the first region of the first hyper-spectral image; and wherein characterizing qualities of the first set of produce units in the produce display based on the first spectral profile comprises:

accessing a set of template spectral profiles, each template spectral profile in the set of template spectral profiles identifying characteristic pixel values representative of the varietal in a particular ripeness stage in a set of ripeness stages; and for each produce unit in the first set of produce units:
identifying a particular template spectral profile, in the set of template spectral profiles, comprising characteristic pixel values approximating pixel values in the first spectral profile of the produce unit; and labeling the produce unit with a particular ripeness stage represented by the particular template spectral profile.

9. The method of claim 8:
wherein accessing the set of template spectral profiles comprises accessing a set of template spectral profiles identifying characteristic pixel values representative of the varietal across the set of ripeness stages comprising an underripe stage, a ripe stage, and an overripe stage;

wherein detecting the first proportion of produce units in a first ripeness stage comprises calculating the first proportion of produce units, in the first set of produce units, in the overripe stage; and wherein generating the prompt comprises generating the prompt further in response to the first proportion of produce units in the overripe stage exceeding a threshold proportion.

10. The method of claim 1:
wherein extracting the first spectral profile from the first region of the first hyper-spectral image comprises:
detecting the first set of produce units depicted in the first hyper-spectral image;
defining the first region of the first hyper-spectral image depicting the first set of produce units;
identifying a representative pixel cluster in the first region of the first hyper-spectral image; and
extracting the first spectral profile from the representative pixel cluster based on pixel values, across a set of wavelengths, of pixels contained within the representative pixel cluster; and wherein identifying the first varietal of the first set of produce units comprises:
accessing a set of template spectral profiles, each template spectral profile in the set of template spectral profiles defining characteristic pixel values, across a set of wavelengths, representative of a particular varietal in a set of varietals;
identifying a particular template spectral profile, in the set of template spectral profiles, comprising characteristic pixel values approximating pixel values in the first spectral profile;
labeling the first set of produce units with the varietal represented by the particular template spectral profile.

11. The method of claim 1:
further comprising accessing a first photographic image, of the produce display, recorded at approximately the first time;
wherein identifying the first varietal of the first set of produce units comprises:
detecting a display tag in the first photographic image; and
reading an identifier of the first varietal from the display tag;
further comprising retrieving a produce quality model associated with the first varietal; and
wherein characterizing qualities of the first set of produce units comprises characterizing qualities of the first set of produce units based on the first spectral profile and the produce quality model.

12. The method of claim 1, further comprising:
accessing a first photographic image, of the produce display, recorded at approximately the first time;
detecting a display tag in the first photographic image;
reading an identifier of a target varietal, allocated to the produce display, from the display tag;
extracting a second spectral profile from a second region of the first hyper-spectral image depicting a second produce unit;
identifying a second varietal of the second produce unit based on the second spectral profile; and
in response to a difference between the second varietal and the target varietal, generating a second prompt to remove the second produce unit from the produce display.

13. The method of claim 1, further comprising:
calculating a difference between the first volumetric distribution and a target volumetric distribution of produce units assigned to the produce display by a planogram of the store; and
in response to the difference exceeding a threshold difference, serving a second prompt to a computing device, assigned to an associate of the store, to reorganize the produce display.

14. The method of claim 1, further comprising:
estimating an average ripeness of the first set of produce units based on the first spectral profile;
predicting an average time to peak ripeness for the first set of produce units based on the average ripeness; and
updating a digital display arranged proximal the produce display to indicate the average time to peak ripeness for the first set of produce units.

15. The method of claim 1:
wherein extracting the first spectral profile from the first region of the first hyper-spectral image comprises, for each produce unit in the first set of produce units:
detecting a boundary of the produce unit depicted in the first region of the first hyper-spectral image;
identifying a subregion of the first hyper-spectral image contained within the boundary of the produce unit;
wherein characterizing qualities of the first set of produce units in the produce display based on the first spectral profile comprises:
for each produce unit in the first set first produce units:
extracting the set of spectral features from the subregion of the first hyper-spectral image depicting the produce unit; and
interpreting a quality, in a range of qualities, of the produce unit from the set of spectral features; and
calculating a variance in quality across the first set of produce units; and wherein generating the prompt comprises generating the prompt to remove the first quantity of produce units from the produce display in order to reduce variance in quality of produce units occupying the produce display.

16. The method of claim 1:
further comprising,
  accessing a second hyper-spectral image, of a produce bin, recorded at a second time during delivery of the produce bin to the store;
  extracting a second spectral profile from a second region of the second hyper-spectral image depicting a second set of produce units in the produce bin;
  identifying the second set of produce units as of the first varietal;
  characterizing qualities of the second set of produce units in the produce display based on the second spectral profile; and
  in response to qualities of the second set of produce units in the produce bin falling within the target quality range assigned to the first varietal, authorizing receipt of the second set of produce units; and
  wherein generating the prompt comprises generating the prompt to replace the first quantity of produce units in the produce display with produce units in the second set of produce units.

17. A method for tracking fresh produce in a store includes:
  accessing, by a processor of a computing system, a first hyper-spectral image, of a produce display in a store, recorded at a first time;
  accessing, by the processor, a first depth image, of the produce display, recorded at approximately the first time;
  extracting, by the processor, a first-spectral profile from a first region of the first hyper-spectral image depicting a first set of produce units in the produce display, the first-spectral profile representing a set of hyper-spectral features;
  extracting, by the processor, a first volumetric representation of the first set of produce units from the first depth image;
  identifying, by the processor, a first varietal of the first set of produce units based on the first-spectral profile;
  characterizing qualities of the first set of produce units in the produce display based on the first spectral profile;
  detecting, by the processor, a first proportion of overripe produce units in the first set of produce units, and a second proportion of ripe produce units in first set of produce units based on the first spectral profile;
  estimating, by the processor, a total quantity of produce units in the first set of produce units occupying the produce display at the first time based on the first volumetric representation;
  predicting, by the processor, a first quantity of overripe produce units occupying the produce display at the first time based on the total quantity of produce units and the first proportion;
  calculating a difference between the total quantity of produce units and a target quantity of produce units of the first varietal assigned to the produce display by a planogram of the store;
  calculating a restocking quantity for the produce display based on the difference and the first quantity of overripe produce units; and
  in response to qualities of the first set of produce units in the produce display deviating from a target quality range assigned to the first varietal, generating a prompt to remove the first quantity of overripe produce units from the produce display and to restock the produce display with the restocking quantity of produce units of the first varietal.

18. A method for tracking fresh produce in a store includes:
  accessing, by a processor of a computing system, a first hyper-spectral image, of a produce display in a store, recorded at a first time;
  accessing, by the processor, a first depth image, of the produce display, recorded at approximately the first time;
  extracting, by the processor, a first-spectral profile from a first region of the first hyper—spectral image depicting a first set of produce units in the produce display, the first-spectral profile representing a set of hyper-spectral features;
  extracting, by the processor, a first volumetric representation of the first set of produce units from the first depth image;
  identifying, by the processor, a first varietal of the first set of produce units based on the first-spectral profile;
  characterizing qualities of the first set of produce units in the produce display based on the first spectral profile;
  detecting, by the processor, a first proportion of damaged produce units in the first set of produce units, and a second proportion of ripe produce units in first set of produce units based on the first spectral profile;
  estimating, by the processor, a total quantity of produce units in the first set of produce units occupying the produce display at the first time based on the first volumetric representation;
  predicting, by the processor, a first quantity of damaged produce units occupying the produce display at the first time based on the total quantity of produce units and the first proportion;
  calculating a difference between the total quantity of produce units and a target quantity of produce units of the first varietal assigned to the produce display by a planogram of the store;
  calculating a restocking quantity for the produce display based on the difference and the first quantity of damaged produce units; and
  in response to qualities of the first set of produce units in the produce display deviating from a target quality range assigned to the first varietal, generating a prompt to remove the first quantity of damaged produce units from the produce display and to restock the produce display with the restocking quantity of produce units of the first varietal.

* * * * *